United States Patent
Jones et al.

(10) Patent No.: US 8,805,715 B1
(45) Date of Patent: Aug. 12, 2014

(54) METHOD FOR IMPROVING THE PERFORMANCE OF MESSAGES INCLUDING INTERNET SPLASH PAGES

(75) Inventors: Brian B. Jones, Sunnyvale, CA (US); Sanjay Ranka, Cupertino, CA (US)

(73) Assignee: Carl Meyer, Saratoga, CA (US)

( * ) Notice: Subject to any disclaimer, the term of this patent is extended or adjusted under 35 U.S.C. 154(b) by 3381 days.

(21) Appl. No.: 10/017,499

(22) Filed: Dec. 7, 2001

Related U.S. Application Data

(60) Provisional application No. 60/255,951, filed on Dec. 15, 2000, provisional application No. 60/255,949, filed on Dec. 15, 2000, provisional application No. 60/255,939, filed on Dec. 15, 2000, provisional application No. 60/173,689, filed on Dec. 29, 1999.

(51) Int. Cl.
*G06Q 30/02* (2012.01)

(52) U.S. Cl.
USPC ............. 705/7.33; 705/14.66; 705/14.73

(58) Field of Classification Search
CPC ......... G06Q 30/0204; G06Q 30/0251; G06Q 30/0269; G06Q 30/0277
USPC ................ 705/7.33, 14.49, 14.66, 14.73
See application file for complete search history.

(56) References Cited

U.S. PATENT DOCUMENTS

| | | | |
|---|---|---|---|
| 5,617,538 A | 4/1997 | Heller | |
| 5,680,535 A * | 10/1997 | Harbin et al. | 345/473 |
| 5,727,129 A | 3/1998 | Barrett et al. | |
| 5,809,481 A | 9/1998 | Baron et al. | |
| 5,848,397 A | 12/1998 | Marsh et al. | |
| 5,873,068 A | 2/1999 | Beaumont et al. | |
| 5,884,305 A | 3/1999 | Kleinberg et al. | |
| 5,889,799 A * | 3/1999 | Grossman et al. | 379/266.08 |
| 5,937,037 A | 8/1999 | Kamel et al. | |
| 5,937,392 A | 8/1999 | Alberts | |
| 6,128,651 A | 10/2000 | Cezar | |
| 6,161,127 A | 12/2000 | Cezar et al. | |
| 6,182,059 B1 | 1/2001 | Angotti et al. | |
| 6,757,661 B1 * | 6/2004 | Blaser et al. | 705/14.54 |
| 6,993,493 B1 * | 1/2006 | Galperin et al. | 705/10 |
| 7,130,808 B1 * | 10/2006 | Ranka et al. | 705/10 |
| 7,406,434 B1 | 7/2008 | Chang et al. | |
| 2002/0035568 A1 * | 3/2002 | Benthin et al. | 707/102 |
| 2002/0099600 A1 | 7/2002 | Merriman | |
| 2003/0110080 A1 * | 6/2003 | Tsutani et al. | 705/14 |

* cited by examiner

*Primary Examiner* — Donald L. Champagne
(74) *Attorney, Agent, or Firm* — David H. Judson

(57) ABSTRACT

System, method, computer program and computer program improve performance of messaging campaigns particularly of Internet web splash pages. Executing, improving, and desirably optimizing performance of marketing campaigns in which splash pages or other splash pages are shown to visitors on a web site. System and method provide an automated splash page targeting and allocation scheme that is dynamic and adaptive. System for autonomously selecting attributes of a splash page to improve splash page performance in an interactive measurable medium such as the Internet if such attributes are available, includes means for receiving splash page attribute configuration information and splash page performance information, an optimization engine receiving the splash page performance information and making decisions based on received splash page performance information and predetermined rules to generate future splash page attribute configuration information, and a splash page server to deliver splash pages based on future splash page attribute configuration information.

9 Claims, 10 Drawing Sheets

METHOD FOR IMPROVING THE PERFORMANCE OF MESSAGES INCLUDING INTERNET SPLASH PAGES

RELATED APPLICATIONS

U.S. Patent Application Ser. No. 60/255,951 filed Dec. 15, 2000 entitled System, Method, and Business Operating Model for Improving the Performance of Splash Pages, U.S. Patent Application Ser. No. 60/255,949 filed Dec. 15, 2000 entitled Method, Algorithm, and Computer Program for Targeting Messages Including Advertisements in an Interactive Measurable Medium; and U.S. Patent Application Ser. No. 60/255,939 filed Dec. 15, 2000 entitled Method for Improving the Performance of Splash Pages.

U.S. patent application Ser. No. 09/586,394, filed Jun. 2, 2000 and entitled System and Method for Optimizing The Performance of Email and Other Splash Page Campaigns; U.S. patent application Ser. No. 09/586,387, filed Jun. 2, 2000 and entitled Method, Algorithm, and Computer Program for Optimizing the Performance of Messages Including Advertisements in an Interactive Measurable Medium; and U.S. patent application Ser. No. 09/586,393, filed Jun. 2, 2000 entitled System, Method and Operating Model for Optimizing The Performance of Messages In An Interactive Measurable Medium. U.S. Patent Application Ser. No. 60/173,689 filed Dec. 29, 1999 entitled Optimizing the Performance of Emails. Each of the above referenced patent applications are hereby incorporated by reference.

FIELD OF THE INVENTION

This invention relates generally to systems, methods, computer program products, and operating models for improving and optimizing the performance of messages, advertisements, and other content, and more particularly to systems, methods, computer programs products, and operating models for optimizing the performance of advertisements, splash pages, landing pages and other content and messages in an interactive measurable medium such as a global network of interconnected information devices and appliances, where an example of such a global network is the Internet.

BACKGROUND

Most online marketing campaigns concentrate on enticing viewers to click on the creative. There is usually little or no ability to optimize what happens immediately after the initial click. Today most marketers don't have an effective way to optimize post-clickthrough conversion for prospective customers acquired through banner advertising, sponsorships, promotions, or email—often, the clickthrough leads directly to the home page, or to a lower level page that isn't optimized by taking into account feedback on what attributes work most effectively.

Various site analysis and reporting systems currently exist for the limited tracking of performance of visitors on or to a site. These systems update performance information on a limited periodic basis in the form of typically printed reports. The users are also provided with an some parameters to configure the delivery and tracking. In the current state-of-the-art, these reports are provided in printed form or in the electronic equivalent of printed form (for example, webpages, spreadsheets, charts, or the like), and are manually analyzed by trained analysis personnel to derive new, improved configurations. Typically, these configurations consist of allocations of advertisements—the fraction of available visitors that are allocated to each advertisement. In particular, some advertisements may be turned off (allocated no visitors) when the analysis personnel determine them to be underperforming. This manual process is tedious and error-prone and has an inherent delay between the period of data collection and the time new advertisements are to be placed because of the large amount of data to be analyzed and the large number of parameters to be modified. Even if errors are not made and the user is able to overcome the tedium of the process, it is unlikely to yield optimal or even near-optimal recommendations for advertisement configurations. This is especially true in light of the typical delay—between a day and a week—between data collection, analysis, and a new campaign configuration based on the analysis. Further, the splash page performance may improve or deteriorate over time, such as for example if the performance of a splash page is non-stationary in a statistical sense. There are a number of potential reasons for a splash page to have non-stationary behavior in the underlying performance. For example, a splash page that promises overnight delivery may be quite effective shortly before Christmas, but much less effective on the day after Christmas. Even absent a particular identifiable event, the performance of splash pages may change over time.

In light of the current situation described above, there remains a need for an automated system for optimizing allocation parameters. There also remains a need for an automated system and method for rapidly and efficiently executing the optimized allocation parameters to show the right splash pages. Optimization is in essence a multi-dimensional optimization problem, that by-and-large cannot be timely solved using conventional tools, methods, or systems. Furthermore, optimizations on multiple dimensions are impractical to do manually and exacerbate the time delay between data collection and reconfiguration. It is noted that these problems exist independently of the type of splash page or other content, and that such issues and problems exist relative to advertisements for products and services, political campaigns, ballot measures and initiatives, media programming, lobbying, surveys, polling, news headlines, sports scores, as well as other directed marketing, promotions, surveys, news, information, other content generally, and the like.

There also remains a need for a system and method that can learn and optimize across the various other parameters to allow an advertiser (or other messaging entity) to display different splash pages (or other content or splash pages) based on a user-specific web-browsing profile which may include time-of-day, geographic location, demographic information, or the like, as well as other user-targeting information. This system should work particularly effectively in scenarios where the splash page performance may improve or deteriorate over time, for example, in situations when the performance of a splash page is non-stationary in a statistical sense.

Reporting and analysis tools available today treat splash pages as atomic entities. However, it is usually the case that splash pages may be broken down into elements, or attributes, such as color, offer, or the like. Since current reporting tools treat splash pages as atomic entities, no information is typically available to analyze the effects of changes to different attributes. Therefore, there remains a need for a system and method that: 1) generates a plurality of splash pages, each having different values of the different attributes, and 2) collects information on the performance of such splash pages. The system and method can use that information to report on the most effective attribute levels, as well as to optimize campaign performance by generating splash pages for current or future campaigns.

Different advertising campaigns may seek to optimize different metrics. There remains a need for a system and method that is sufficiently flexible to optimize a wide variety of performance metrics. For example, one simple but frequently used optimization objective is to maximize the number of user signups from a splash page. Another objective may be to maximize the total sales generated by all the consumers.

Visitors may arrive on a splash page through different channels such as email, banner ads and affiliate programs. There remains a further need to identify better performing channels from which the visitors are arriving as quickly as possible so that the use and cost associated with poorer performing channels may be terminated in favor of better performing channels.

SUMMARY

Figure 1:
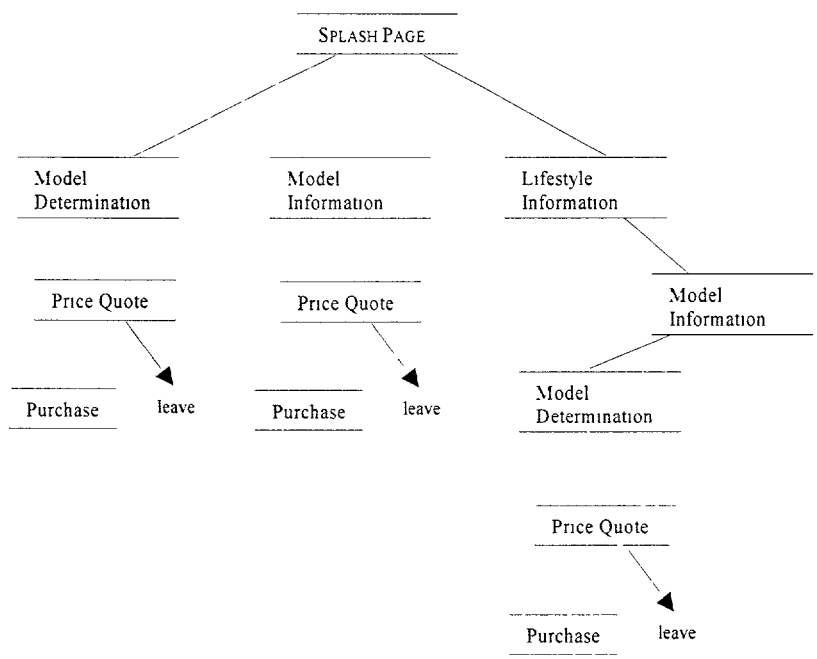
FIG. 1 is an exemplary illustration of possible paths in a sample splash page system, showing the different action pages and possible outcomes in such a system.

System, method, computer program and computer program product provide advantageous features for improving the performance of messaging campaigns particularly of Internet web splash pages. The algorithm based procedures and methods of the invention provide a mechanism to determine which advertisements or messages should be shown to visitors in order to maximize an objective function of interest to the advertiser. For example, the inventive system and method may be used to determine which splash pages should be shown to visitors to maximize an objective function. The method may additionally be used to optimize the allocations of additional action pages that customers may visit in the course of interacting with, or making a transaction with, the advertiser. The method will be implemented as a computer program on a general-purpose computer, such as, for example, a computer operating in an Internet or other network server environment. The method is described in the context of an exemplary computer system, which may be used in conjunction with the inventive method, procedure, computer program, and computer program product.

Embodiments of the invention relates to executing, improving, and desirably optimizing the performance of marketing campaigns in which splash pages or other splash pages are shown to visitors on a web site. A splash page (marketing) campaign involves a list of splash page alternatives and a target customer population. The marketer's goal is to allocate the splash page alternatives to the customer population to optimize business objectives such as maximizing the number of positive responses received or the amount of sales generated. The inventive system and method provides an automated splash page targeting and allocation scheme that is dynamic and adaptive. The system and method may additionally be used to optimize the allocations of additional action pages that customers may visit in the course of interacting with, or making a transaction with, the advertiser.

The invention provides a system for autonomously selecting attributes of a splash page to improve splash page performance in an interactive measurable medium if such attributes are available. The system includes means for receiving splash page attribute configuration information and splash page performance information, an Optimization Engine receiving the splash page performance information and making decisions based on the received splash page performance information and predetermined rules to generate future splash page attribute configuration information, and a splash page server to deliver splash pages based on the future splash page attribute configuration information.

The interactive measurable medium may be the Internet. The system includes: a database storing splash page attribute configuration information, including future splash page attribute configuration information, and past splash page performance report information; an Optimization Engine receiving the past splash page performance information and making decisions based on the received past splash page performance information and predetermined rules to generate future splash page attribute configuration information; and a splash page server proxy that may interact with an external splash page delivery system over a communication link to configure the external system to deliver the future splash page based on the future splash page attribute configuration information. In some cases, these interactions can be handled by the systems internally. In one embodiment, the predetermined rules include past splash page attribute configuration information associated with the past splash page performance information. These predetermined rules may optionally further include campaign data and optimization preference data.

Additionally, the invention provides a method for improving the stage-to-stage performance of a splash page in a multi-stage splash page campaign in an interactive measurable medium, where the method includes the steps of: reading prior stage splash page performance; and generating a current splash page allocation based on the current splash page state.

Other procedures and subsystems are provided that may be used separately and/or with external processing entities, or combined and integrated in various ways to yield different system configurations and processing distributions yet encompass the inventive concept.

DETAILED DESCRIPTION OF EMBODIMENTS

Embodiments of the invention are now described relative to the figures. Section headers are provided for the convenience of the reader and it will be understood that aspects of the invention are describe throughout this description and that the header do not in any way limit the scope of the invention or embodiments thereof.

These algorithms provide a mechanism to determine which advertisements should be shown to visitors in order to maximize an objective function of interest to the advertiser. The method may advantageously be implemented as a computer program stored and executing on a general-purpose computer, such as, for example, a computer operating in an Internet or other network server environment. The method is described in the context of an exemplary computer system, which may be used in conjunction with the inventive method, procedure, computer program, and computer program product. One example of the type of system with which the inventive method, procedures, and algorithms may be used are described in co-pending U.S. Patent Application Ser. No. 60/255,951 filed Dec. 15, 2000 entitled System, Method, and Business Operating Model for Improving the Performance of Splash Pages by Vikas Manocha, Sanjay Ranka, Sankrant Sanu, Michael Tuchen, Brian Jones, and Kevin Yen, and is incorporated herein by reference in its entirety.

This invention provides a system, method, computer program, and operating model for optimizing the performance of splash pages and or other content or messages, and optionally for placing or serving the splash page or other content to a target device and ultimately to the visitor or user or operator of the target device. Among other features, the present invention provides an automated system for optimizing allocation parameters for each splash page placement and executes such placements on the Internet.

The system and the algorithms provide a mechanism to determine which splash pages should be shown to visitors in order to maximize an objective function of interest to the advertiser or other messaging entity. While splash pages are used as an example throughout this description, these problems exist independently of the type of splash page. The splash pages that are being optimized may be any type of splash page or communication and include by way of example but not limitation, splash pages such as advertisements including web site banner ads, marketing campaigns, political campaigns, surveys, sales, promotions of various types, public service announcements, electronic mail or email, pop-up windows, and the like. Usually, there will be several splash page alternatives.

In this description of the invention, the term "optimizing" is used to describe the attempt to improve performance. However, those workers having ordinary skill in the art will appreciate that while there may be only a single "optimum" that may not always be attained, there are many degrees of performance improvement that may be obtained. As used in this description, optimization means improvement rather than requiring attainment of any single optimum value as well as an actual optimization to the extent that such optimization can be achieved. Stated differently, optimization refers to procedures, algorithms, and other attempts to attain optimum performance rather than requiring that the optimum performance be attained as well as to any actual optimization. (Exemplary optimization procedures that may be used in embodiments of the invention are described in additional detail elsewhere herein.)

The invention can also learn and optimize across the various other parameters that are available for configuration of the splash page systems. An optimization algorithm is implemented as a computer program in an Optimization Engine to accomplish this. For instance, different splash pages may be served to visitors based on the time of the day, the profile of the user visiting the site, the channel he/she may have arrived from, the visitor or users geographic location and other demographic information, as well as other targeting criteria. In one embodiment, the inventive optimizing system and method learn and then set the appropriate parameters across multiple content and placement dimensions so as to optimize the objective specified by the splash page provider, such as an advertiser.

In addition, the inventive system and method gather user input and optimize for higher-level attributes (as defined elsewhere herein) that are more or most relevant to the advertiser. The information about these attributes has not heretofore been available in the traditional splash page serving systems, which deal with the splash page as an atomic unit. By allowing the user to give attribute information for the different splash pages, the optimizing splash page serving system can learn which attributes and which levels within an attribute (where multilevel attributes are provided) are most effective in increasing performance of the advertising campaign. This information is also extremely useful in generating a more effective pool of splash pages for the next campaign and determining optimal placements.

Better-performing channels may also be more readily identified so that the use and cost associated with placing ads in poorer performing channels may be terminated in favor of placing such ads in better performing zones, or in lowering expenditures for such lower performing channels. However, many of these channel buys are long-term (for example, from a month to two or more months) in nature and contractual obligations may not allow the advertiser to stop using the channel and stop paying for the impressions already bought. Even in the situation where a few weeks lead-time is required to stop using a buy zone, the advertiser may swap the impressions bought with another advertiser such that the overall performance may improve for both the advertisers. The provision of the inventive method may therefore provide a method for interchanging ad space among advertisers or other businesses. These exchanges may be facilitated by a system and method that automates the rapid analysis of performance data and rapid allocation of ads among the full pool of available ad allocation options.

Just like splash page alternatives, there may be more than one alternative on these channels. For example, when using banner ads as a way of attracting visitors, multiple banner ads may be in play. Choosing better combinations of banner ad alternative and splash page alternatives will result in better overall performance.

Those workers having ordinary skill in the art will appreciate, in light of the description provided above and in greater detail below, that the system as described above can be easily extended to be useful for optimizing splash page types other than splash pages, including, for example: (1) other forms of advertisements such as emails, (2) pop-up windows alternatives, (3) banner ad alternatives, (4) web content alternatives for a web page, and (5) web layout alternatives for web page layout.

In one aspect, the invention is a system for the optimizing splash pages in an interactive medium and automating the configuration of a splash page server system in a larger interactive medium, such as the Internet. The system includes an optimizing engine and an optimization algorithm or procedure that takes as input an ad performance report and generates recommended splash page or ad configuration parameters for the optimal placement and targeting of ads. It loads the reports from the database and stores the parameter values into a database. The database stores user-configured information, Optimization Engine generated configuration information, and the performance report information from the ad server system. A splash page server interaction service loads performance reports from the splash page server system and stores them in the database as well as taking user or Optimization Engine generated settings and setting them into the splash page server system. Finally, a user interface allows the user to enter campaign data and specifications about the optimization and view performance, allocation and other kind of reports.

In another aspect, the invention provides a business or operating model for providing advertisement, splash page, or other content optimization and placement. The operating model is applicable for but not limited to business-to-business electronic commerce as well as business-to-consumer and consumer-to-consumer electronic commerce (e-commerce).

1.1 Definitions

In this section, we briefly define some of the terms we will use in the rest of this document.

Stage: While visitors view advertisements continuously, reports on advertising traffic and success are generally available at regular intervals. We will call the intermediate time between two reports as a stage. In most cases, optimization will be performed once per stage.

Splash Pages: We will use splash pages as an example of the content that the system might optimize. "Jump page" and "landing page" are other terms used in the industry to refer to a splash page. Many firms that sell products and services over the Internet use a splash page as the initial introduction of the product or service to the visitor. Visitors may arrive at the site directly or by clicking on a banner, an affiliate site or an email link. This splash page may have many creative elements known as "attributes" (see below.) Different splash pages may be served to different visitors. The inventive system optimizes the allocation of splash pages to visitors to maximize an objective metric of interest to the advertiser. That is, it generates a strategy or recommendation for displaying banners during the next stage of the campaign. While splash pages of retailing firms are obvious beneficiaries of such technology, many other kinds of content could substitute for splash pages in the description below. For example, news media sites might wish to choose between various "front pages" in order to maximize readership.

Decision Tree: A splash page offers a number of links to proceed to the next step. Some of these links may lead to additional pages where purchases can be made; others may lead to pages with additional product information, or the like. These secondary pages may also have a number of links, and so on. Thus, it is sufficient to consider the set of possible visitor paths as a tree, where each node represents a page, and there is a branch from the node for every link on that page. Of course, any or even every node may also have a "no purchase" branch, where the visitor decides to leave the system.

Payoff: Splash pages will have associated with them a set of payoffs—that is, some visitors will take an action or actions that results in a benefit to the advertiser that is expressed via a continuous or multivalued variable. In a large fraction of cases the user does not perform any useful actions (vis-à-vis the optimization objective) resulting in a zero payoff. The set of non-zero payoffs generated by a splash page may be described by a probability distribution; in some cases, this distribution may be a known distribution like a Normal or Lognormal, while in other cases it will be a non-parametric distribution. This distribution is the probability density as a function of the value of the objective metric. This metric will often be expressed in monetary terms; for example, revenue, sales or profit. However, in general, it can be any sort of quantifiable desired response from a visitor. Examples include whether or not a visitor signs up for a membership, the number of polling questions that a visitor answers, or the amount of time that a visitor spends at a web site.

Unique active identer: It is often useful to track various actions as a customer makes his or her way through an advertiser site. Specifically, it may be valuable to identify customer visits to particular pages, or to track payoff information such as total sale amount, balance transferred, or the like. Unique active identifiers identify and communicate this information to the system. In some cases, the unique active identifier might be a transparent one-pixel GIF, served by the system. In other cases, the unique active identifier is a more sophisticated "web bug," or similar device, that actively transmits pertinent information about a visitor and visit to the system.

Attributes: Each splash page can be described in terms of a set of attributes. An "attribute" is an important characteristic of an advertisement alternative. For instance, in a given situation, a splash page may be conceptualized as consisting of the following attributes: background color, offer, and product picture. There may be several choices available for each attribute. We will use the term "level" to represent different choices along the same attribute. For example, there may be sixteen different background colors, ten different offers, and twenty different product pictures from which an advertiser might ideally choose or select. The level along each attribute may have a profound and significant impact on a user's response to the splash page. For example, in a splash page for a credit card company, the annual percentage rate or APR may have a significant impact on the success of the ad. Conventional systems and methods treat individual splash pages as atomic units wherein constituent elements or parts, such as background color, offer, picture, and the like are not separable.

Targeting: The objective is to maximize the payoff metric by altering the allocation of splash pages or splash pages presented to visitors. While the primary relevant information will be the outcomes for each visitor to the splash page, there will often be additional data available. This information may include, by way of example, but not limitation:

Data based on the current visit. Examples of this type of profiling information include the time of the visit, the type of browser used by the visitor, the IP address, the banner clicked by the visitor, the site where the banner was shown, the time of the day, and the like.

Data based on an earlier visit. An example is data from a registration form that was filled out by the visitor on an earlier visit. This may include demographic and psychographic information.

Data from external sources. Examples include an external customer database that may provide data on the purchase history of the visitor. This may, for example, include demographic and/or psychographic information.

The visitor profile space includes and generally consists of a multidimensional space where each dimension corresponds to one of the above profiling attributes. Visitors are often classified into market segments based on this data. For example, segments based on age or income might be defined. A visitor segment consists of a portion of the visitor profile space. By selecting different splash pages for different visitor profiles, the overall campaign performance can be improved.

Allocation: In the case that multiple splash pages are available, the allocation for a given visitor segment refers to the fraction of visitors (from that segment) who will, upon arrival at the advertiser's site, be presented with each splash page. For example, if four splash pages were available, one possible allocation would assign half the visitors to the first page, one-quarter to the second page, one-quarter to the third page, and none to the fourth page. Every visitor must be directed to some page; that is, the allocation fractions must sum to one.

Campaign constraints. A marketing manager or other person responsible for directing the campaign may typically impose certain constraints on when a certain splash page may be displayed. For example, a given splash page may be excluded from appearing for visitors clicking on a given banner. This is merely illustrative of the constraints that may be imposed and those workers having ordinary skill in the art in light of the description provided here will appreciate that virtually any parameter or condition associated with splash pages may be constrained by the marketing manager or other responsible person. In the context of the inventive structure and method, the ability to constrain one or more campaign allocation parameters, conditions, or other attributes is desirable so that any constraints that might not normally be enforced by the optimization procedure are understood and taken into account.

1.2 System Overview

Figure 3:
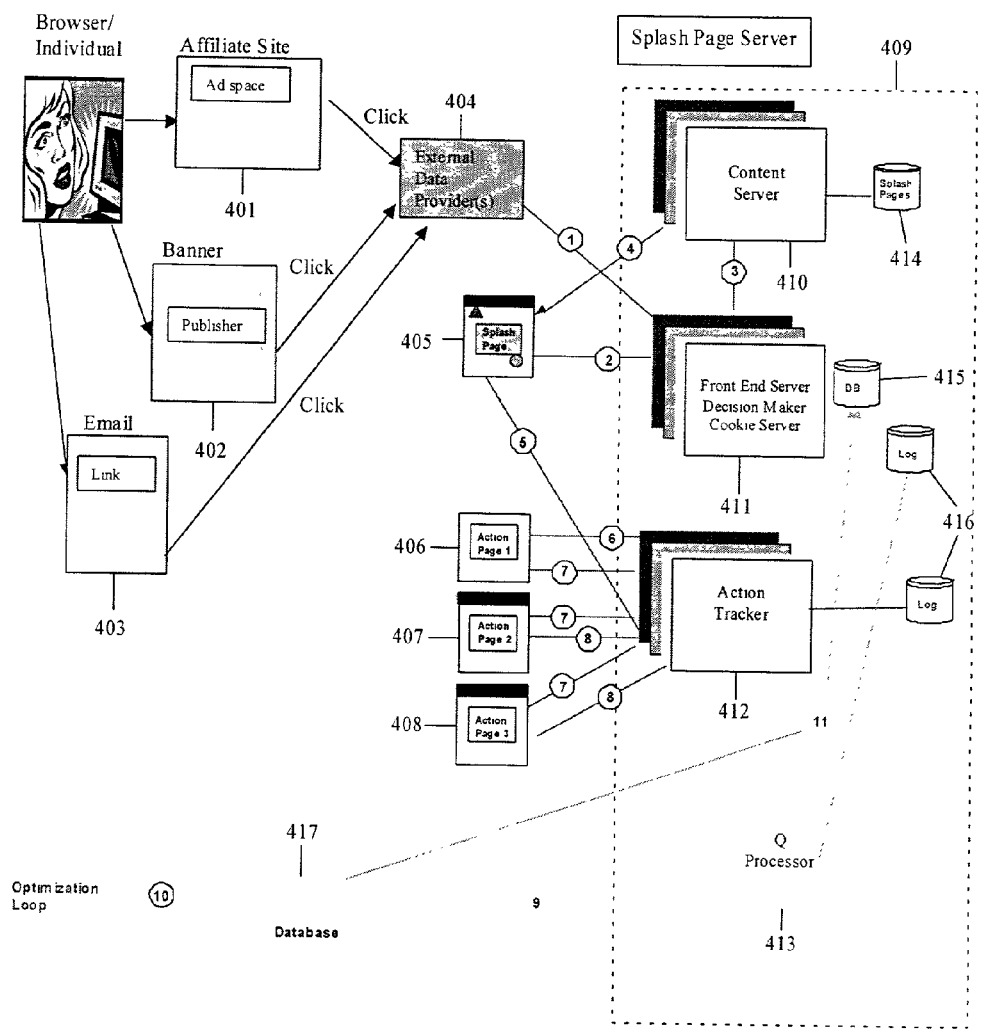
FIG. 3 is a diagrammatic illustration showing one embodiment of an overall system and operating model according to the invention, including the information flow from the visitor's click through the decision making process to the data logging and optimization.

In general, the path for a visitor to participate in an e-commerce transaction begins with his arrival at the site and ends with a purchase agreement (See FIG. 3). Visitors may arrive at the site directly or by clicking on a banner 402 or an email link 403. This click takes him or her to a "splash page" 405—a specially designed web page that describes the product or offer in further detail, and generally offers a number of links to proceed to the next step. Some of these links may lead to additional pages where purchases can be made 406, 407; others may lead to pages 408 with additional product information, or the like. These secondary pages may also have a number of links, and so on. Thus, it is sufficient to consider the set of possible visitor paths as a tree, where each node represents a page, and there is a branch from that node for every link on that page. Of course, some or all of the nodes may also has a "no purchase" branch, where the visitor decides to leave the site.

The system is designed to show certain splash pages to certain visitors in such a way as to maximize some objective, such as the fraction of visitors who purchase an item, sign up for a contest, vote in a particular way, or the like, or the amount of money spent. That is, visitor's actions may be classified either as a binary payoff (the visitor's action results in the payoff, or it does not) or a continuous or multivalued payoff (the visitor's action may be measured, and each visitor's action may have a different value to the advertiser) or a combination thereof. The objective function to be maximized may be a single binary metric, a single continuous or multivalued metric, or some combination of multiple binary and continuous or multivalued metrics. In particular, the metric may be some linear or non-linear combination of post-click actions, weighted either equally or unequally.

1.2.1 Problem Example

As an example of such a structure, FIG. 1 shows possible visitor paths through a splash page structure for athletic shoe sales. The visitor arrives at the initial splash page, and then has three options. First, she can continue directly through a purchase sequence starting with the identification of the shoe model (or other product or service) she would like to buy, leading to a price quote. She may then either purchase based on the offer or quote or decline the offer or quote. Second, she might investigate some intermediate pages with additional information on the model or models in which she is interested. Upon deciding on a model, she can request a price quote, and again can purchase or decline the offer or quote. Finally, she may browse a set of lifestyle information pages, designed to recommend an appropriate model for her use. She may then either request a price quote directly on the recommended model, or peruse additional model information before requesting a price quote. At last, she again may accept or decline the purchase offer. Of course, at every stage there is, implicitly, the option for her to depart from the splash page structure.

Figure 2:
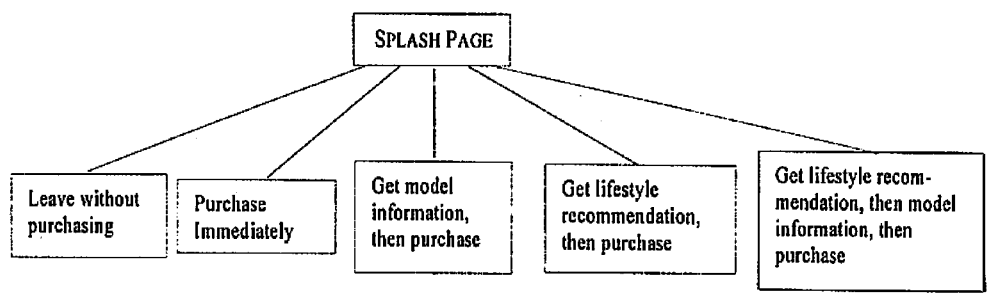
FIG. 2 is an exemplary illustration of the same splash page system under the assumption that all "no purchase" branches have the same cost.

At any node of the tree, the system has the opportunity to choose the particular creative that will be shown to the particular visitor. In general, such optimization could be done at every node of the tree. In most cases, however, certain themes or other logical requirements, as well as the information requests of the visitor, will allow only the initial node to be optimized. The visitor is placed upon one of a number of paths to follow through the tree structure. In such a case, the full tree may be approximated by a single node with many branches, each corresponding to a different path (See FIG. 2). Note that this simplification assumes that all visitors who leave the structure have an equal cost to the advertiser. This allows all paths that leave the structure (both implicit and explicit in FIG. 1) to be consolidated into a single "no purchase" branch.

If there are multiple opportunities for the advertiser to make choices in creative allocations, the algorithms described below can be executed for each choice. Furthermore, if there are significant differences in cost to the advertiser depending on when she leaves the structure, multiple "no purchase" branches may be added. Rather than making zero contribution to the objective function, each will make a negative contribution in proportion to its cost. Those workers with ordinary skill in the art will recognize that there are a number of ways to use these methods to optimize multiple available choices in creative allocations.

1.2.2 System Flow

Figure 4:
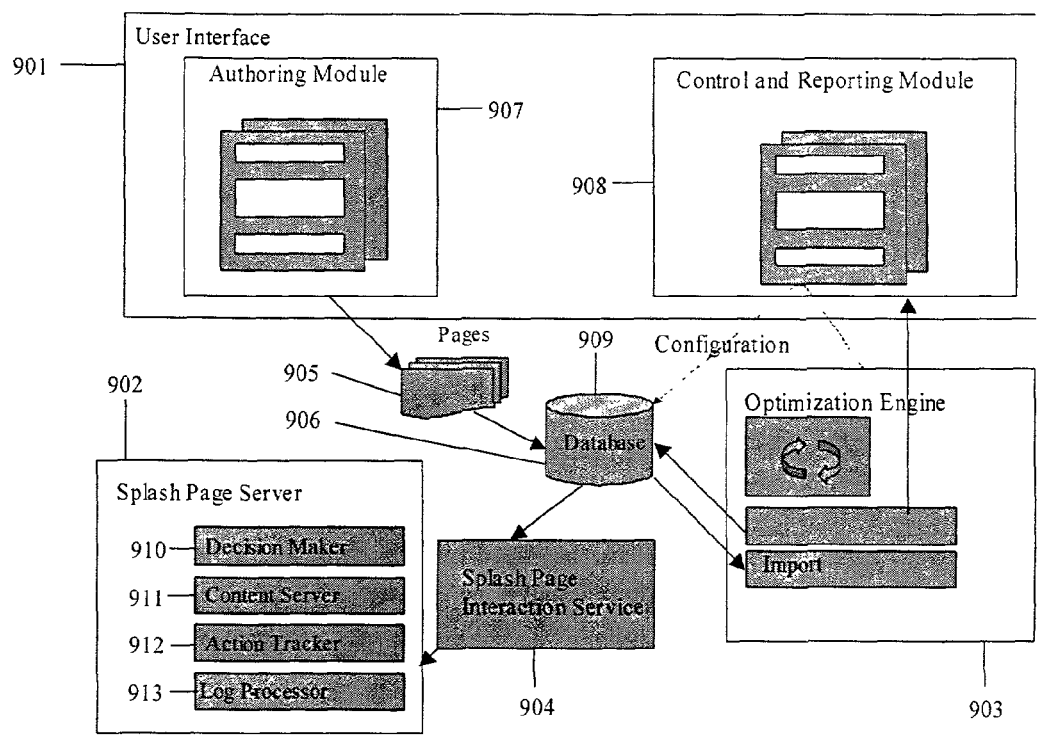
FIG. 4 is a diagrammatic illustration showing a second embodiment of an overall system and operating model according to the invention, including the information flow from the visitor's click through the decision making process to the data logging and optimization.

The following is an example, described with respect to FIG. 4, of one embodiment of several possible data and control flows for the system. In general, the steps in the procedure may be executed in any order so long as any parameters, data, or other item required for another procedural step is available. Therefore the following is exemplary in terms of procedural steps and ordering (as are the other procedural descriptions described herein).

1. Advertisers create or upload pages in an authoring section 907, and set configuration such as optimization goal (including specifying a post-click metric if applicable), whether to subsegment the requests by creative or groups of creative, whether to subsegment the requests by incoming IP address, or the like.
2. The output of the authoring system is a set of pages 905 that are available at runtime. Depending on the requirements, the pages may be either stored HTML pages, as a parameterized set of alternatives that the page selector can generate dynamically, or in some other manner.
3. At runtime, when a visitor request comes in or is otherwise received, the page selector 902 chooses a page to show based on the engine's recommendation. In one embodiment, this recommendation is based on which page is performing the best for requests of that type (for example, from ads on that site, for that particular creative, or the like).

4. If the visitor clicks on one of the instrumented action links, then the request goes through the systems redirector 904 and the click is counted.

5. If the visitor completes a post-click event on the site, a unique active identifier notifies the system so that these events may be counted as well. Continuous or multivalued metrics such as dollars of balance transferred are recorded by transferring parameters via this unique active identifier.

6. Splash page impressions and post-click actions are logged by the system in application queues. On a more or less continuous basis, these queues are flushed into the database 909. After a certain amount of time or data or upon occurrence of some other defined event or condition, the optimization engine is kicked off to make optimization decisions.

7. The Optimization Engine 903 quantifies splash page performance. The method calculates a number of summary statistics or other measure for each page, including (but not necessarily limited to) one or more of the total number of visitors to the splash page, the total number of successful actions related to the splash page, the corresponding action ratio, and one or more parameters describing the frequency distribution of the payoff. In one embodiment, an action ratio is computed and playoff information is evaluated. Evaluation of the payoff information may desirably take into account the manner in which visitor information is provided. For example, (i) if the visitor information has been summarized in the report for use with a particular parameterized distribution, calculate the performance metrics from the parameterized distribution; and (ii) if the visitor information is not summarized in the report, calculate the performance metrics under all payoff distribution models of interest.

8. The Optimization Engine 903 calculates descriptive statistics for each splash page or combination of splash pages; for example, the expected value and the error in the expected value. Each allocation algorithm requires some additional statistics for comparison of splash pages. In one embodiment, these statistics include the expected value of the payoff probability distribution, and the standard error in that estimate. In the case of a non-parametric payoff distribution, the method uses bootstrap resampling methods to estimate the expected value and the standard error in the expected value from the available data. In the case of parametric distributions, the available data is fit with the maximum likelihood parametric distribution, from which the expected value and standard error of the expected value can be calculated, using well-known formulae.

9. The Optimization Engine 903 allocation algorithm is used to determine allocations for the next stage. Using these data, any one of a number of possible algorithms could be used to determine the appropriate allocation of splash pages for the next stage. Three of them are described in detail below. Allocations will be made based on all available data (which may be discounted as described in a later section.) In some cases, data for recent stages may not yet be available. If that is the case, allocations will be made based on all currently available data.

10. Upon determining the optimum allocations for the next stage, the method reports those allocations back to the systems responsible for delivering those splash pages to visitors over the course of the next stage.

At any point in the process, the customer can view reports of current activity and performance by logging into the system user interface.

Those workers having ordinary skill in the art in light of the description provided herein will appreciate that some of the above steps can be reordered or omitted without leading any or to significant deterioration of performance.

Embodiments of each of the major elements of the system that contribute to the operation of the system, as well as certain optional but desirable elements are now described.

1.3 Exemplary System Design

The algorithms described herein may be advantageously employed in a system that may operate on a computer or computing device in an interactive measurable medium such as the Internet. An example of such a system is described in co-pending U.S. Patent Application Ser. No. 60/255,951 filed Dec. 15, 2000 entitled System, Method, and Business Operating Model for Improving the Performance of Splash Pages by Vikas Manocha, Sanjay Ranka, Sankrant Sanu, Michael Tuchen, Brian Jones, and Kevin Yen, incorporated herein by reference in its entirety.

The splash page system may have several modules. In one embodiment, there are five modules including: an authoring module, a user interface module, a splash page server module, and a splash page server interaction service and optimization module. FIG. 4 shows a rough functional block diagram of the service. Of course, it will be clear in light of the description provided here that other embodiments may split or combine the functionality provided by these modules in different ways. Each of the modules is described in detail in the next few subsections.

1.3.1 User Interface 1.3.1.1 Authoring Module

In one embodiment, the system has or provides a template-based page authoring module 907, where user specifies values for configurable attributes rather than uploading a series of complete pages. The advertiser can create their own custom templates and upload them. The template format will be published. Upon submission of a set of configurable attributes, the system will verify that the submission is complete and self-consistent.

In another embodiment, the splash pages may already be available as a "whole" the system will prompt the advertiser to provide the attribute information.

The system can automatically identify which links are being tracked for click-throughs. It automatically parses links in the HTML page, and provides them in a list to the customer, who can then turn off the redirection/tracking for ones where measurement is not important. The user may relabel links for friendlier downstream reporting without altering the HTML.

Instead of uploading splash pages or templates, the client may tell the system about the splash pages by providing a URL. In this scenario, the splash pages are hosted by the client and the splash page system redirects to the best splash page using the allocations generated by the optimization engine.

1.3.1.2 Control and Reporting Module

The Control and Reporting Module 908 gathers configuration information from the splash page sponsor, such as from the advertiser. This may typically be a personal computer or other information device or information appliance that permits a user to enter data into the system and obtain reports to see what happened. In one embodiment of the system the user interface is a web site. The interface allows the user to interact, input, and receive output. For example, in one embodiment, the user may specify an optimization goal, specify the attributes for visitor segments, specify post-click actions, specify a visitor-path tree structure, register banners, register splash page URLs, specify banner-splash constraints, register post-click (post-banner) activities, get performance reports, get daily reports, get granular data logs (including those that have been processed), and otherwise interact and exchange information or data. Some of these operations are described in greater detail immediately below.

1. Specify optimization goal: The user is able to specify goals such as maximizing the sales, signups, revenues etc. In particular, the optimization goal may consist of a binary metric (a given action is taken by the visitor, or it is not; for example, purchase/no purchase) or a continuous or multivalued metric (visitor action may have a range of value; for example, purchase amount) or a combination thereof. Multiple objectives may be used by specifying a function of more than one metric.

2. Specify the attributes for visitor segments: While the primary relevant information will be the outcomes for each visitor to the splash page, there will often be additional data available. The other information which a user may want to include as attributes include data based on the current visit, data based on an earlier visit, or data from external sources. Further description and examples may be found in the "targeting" definition above. These attributes may be used for segmenting the visitor profile space.

3. Specify post-click actions: The system allows a user to specify an binary post-click action such as "the user registered" or "the user purchased something," and to associate it with a unique active identifier. If the user has information about the underlying distribution, the system will enter this information.

4. Specify the visitor path tree structure: As described above, the advertiser's interface generally consists of one or more splash pages linked to a number of other pages, containing additional information, sign-up forms, purchasing apparatus, etc. The system allows a user to specify this structure, and in particular to identify the nodes to be optimized.

5. Register Banners
    Upload splash pages. If the system is serving content, these splash pages will be the content served. If the system is not serving content, then these splash pages are available for archival purposes and ease of reference.
    Specify for each splash page: campaign name, banner name, site name, section name. Mainly for archival purposes and ease of reference.
    Generate click-through URLs for each splash page; splash page URL set will be given to publisher.
    Register new creatives mid-campaign 6. Register Splash Page URLs. These splash pages may be added at the beginning of a campaign, or they may be added to an ongoing campaign.
    Input Splash URLs
    Specify for each Splash URL: campaign name, splash name, attributes for multiattribution analysis, if desired.
    Register new Splash URLs mid-campaign 7. Specify Banner-Splash Constraints. In some cases, it may be desirable to prevent some banners from being associated with some splash pages. If such a combination is restricted, then no visitors who click on the given banner will be directed to the given splash page. These restrictions may be for logical, thematic, business, or other reasons.
    Specify which splashes can be shown for each banner
    Change or register new arcs mid-campaign 8. Register Post-click (post-banner) Activities
    Specify for each postclick activity to track: Categories and their names, types and their names
    Specify which postclick activity to optimize for
    Generate unique active identifiers for customer to implement on their splash and application pages 9. Get Performance Reports
    Overall effectiveness log: An overall summary reports on splash page effectiveness by day.
    Page attribute effectiveness: report on which splash page attributes made the biggest difference in overall performance.
    Effectiveness by input segment: which input segments are having the biggest impact on effectiveness (for example, which sites, which banners, which emails, or the like).

10. Get Daily Reports
    CSV Format
    Each Banner: clicks (hits on redirector)
    Recommended Allocation: current period, next period
    Each Splash: views, clicks, activities' counts, conversion %

11. Get Granular Data Logs (Processed)
    Date of hit
    Time of hit
    Visitor ID (cookie ID), if any
    Http Header info (IP, browser type, etc.)
    Category/Type of Server hit (i.e., which banner, splash, or activity, if any)

Those workers having ordinary skill in the art will appreciate that the above list is not comprehensive and other inputs/outputs may be provided based on the requirements of a specific environment.

1.3.2 Splash Page Server Interaction Service

The job of Splash Page Server Interaction Service 908 is to upload latest splash page allocations to Splash Page Server 902 and to download reports from the splash page server. The service has been designed in such way so that it can talk to different splash page servers. To interact to a particular splash page server, a software or code plugin may generally be used. The plugin for a particular Splash Page Server knows how to interact with that server, and different plugins may be used with different servers. It can use different communication mechanisms like HTTP, XML, COM, or the like for talking with the Server. The plugin also implements some interfaces as defined by the Interaction Service. These interfaces allow the Interaction Service 904 to load the plugin and then pass it the new allocations in a uniform manner. The plugin then applies these new allocations on the splash page server.

1.3.3 Splash Page Server

The goal of the Splash Page Server 902 is to serve the splash page in real time, track the actions taken by the users and generate reports at different levels of granularity and store them in the database or some other persistent storage. A high level description of the runtime services (and their relationship with the optimization service) is described in FIG. 3.

Visitors may arrive at the site in various ways, such as directly or by clicking on a banner, an affiliate site or an email link. Additionally, the request may be routed through an external data service provide which may add additional information. In one embodiment, the sequence of steps the visitor may follow is as follows:
1. A Splash Page request is received by the Decision Maker 910.
2. If the visitor is unrecognized, the Decision Maker 910 cookies the visitor.
3. Decision Maker 910 redirects to a winner splash page based on some or all of the following information, or its equivalent.
   a. Banner, email link, affiliate link information
   b. Information collected from an external source about the browser.
   c. Associate Site Profile
   d. Ad Space Profile
   e. Browser Profile
   f. Information collected about this visitor during previous visits
   g. IP address of the browser
   h. Time
   i. Other demographic, psychographic or visit information
4. Content server 911 serves the Splash Page to the visitor, or redirects the visitor to the splash page hosted elsewhere.
5. Visitor clicks and goes thru action pages 905 (or leaves).
6-8. Action Pages 905 trigger signals that are recorded by Action Tracker 912.
9. Periodically, the Log Processor 913 processes and transfers data from the logs to the database 909 in multiple tables. These tables store information about the number of impressions, clicks, actions etc. for each ad for different associates during different time periods, and for different visitor profiles etc.
10. On specified intervals, the Optimization Engine 903 generates new decision tables for Decision Maker 910. These tables are generated based on impression, click and action data available.

Three routines are included as part of the runtime services: the Decision Maker 910, the Content Server 911, and the Action Tracker 912. Those workers having ordinary skill in the art will appreciate that the functionality of one of these services can be decomposed into multiple services and the functionality of two or more services may be combined into a single service or both decomposition and combination may be performed.

1.3.3.1 Decision Maker (DM)

A visitor gets directed to the splash page system by clicking on a banner or a link in an email or some other channel. The Decision Maker 910 server runs or executes on the web site that hosts the system (in this embodiment), and determines the splash page that should be shown to the visitor. For the decision making, the DM 910 has also the following information that may be used as input:

Visitor Cookie: This uniquely and anonymously identifies a visitor/machine. If a cookie is not present, the DM generates and places one on the machine.

Time of Day

IP Address: The IP Address is used to determine the location of the visitor.

HTTP Request Information: The HTTP request contains other parameters like Browser type, Operating system, and other information related to the HTTP request.

Other assorted information as useful and available may optionally be used.

Based on the information above and optional other information, DM 910 would map the request into one of the subsegments. It would have already loaded the splash page allocations for that subsegment in memory. It then chooses a splash page to serve based on delivery ratio and impressions delivered and redirects the request to that splash page URL, which is hosted on the content server.

1.3.3.2 Content Server

The job of the Content Server 911 is to serve splash pages 905. The content server may be hosted in several alternative ways, including for example, in the following different ways:
1. The system operator hosts the splash pages. In this case the authoring system generates the various splash page combinations and places the splash pages on the content server.
2. The client hosts the splash pages. The splash system would then have the URLs of the pages where it would redirect to.
3. The splash pages can be hosted by a third party content server.

All the above three cases can be handled uniformly as long as the splash pages 905 are uniquely URL addressable. The Decision Maker 910 redirects to a splash page URL and does not need to be concerned with how and where the Splash Pages are hosted.

1.3.3.3 Action Tracker

The job of Action Tracker 912 is to count the different actions and redirect to the actual URL in some cases. The following are the different action tracking scenarios:

Splash page clicks come to the website that hosts this system and then redirected to the actual URL.

Splash Pages clicks go directly to the Action Page, which downloads a unique active identifier from the Action Tracker 912. The action pages may also send Payoff Information like Balance Transferred, Total Sale, and/or other information to the Action Tracker via the unique active identifiers.

1.3.3.4 Log Processor/Report Generator

The job of the Log Processor 913 is to generate reports in a form that be used by the optimization system or the visitor. The Action Tracker 912 records actions in real time, entering raw cookie information and action results into the logs. The Log Processor 913 converts this raw data into a more useful form, correlating actions from the same cookie and generating database entries of visits, actions, and payoffs that may be accessed by other modules.

1.3.4 Authoring Module

The Authoring Module 907 is used to create and upload the various splash page combinations, on which the optimization takes place. Using the authoring module, the user can perform several tasks, including:

Upload templates, which are then used to create splash page combinations.

Upload whole Splash Pages.

Upload URLs to splash pages.

The end-result from this particular embodiment of the authoring module 907 is that it populates the database 909 with a list of splash pages 905 to be used in the campaign. Using the authoring module 907, the user also can also modify, delete existing splash pages 905. The user is allowed to make these changes any time during the campaign. These changes are made by the authoring module 907 in the Database 909. They get automatically picked and used by the Optimization Engine 903 and the Splash Page Interaction Service 904 on their next runs.

Having described the system and method generally, we now focus the description on several exemplary applications. These particular applications and embodiments are described for purposes of illustration and not by way of limitation.

1.4 Exemplary Implementation

The job of the Content Optimizer is to optimize the serving of a Splash Page. At a regular interval, the Content Optimizer looks at the data in the database and generates values for different parameters. The resulting content allocations are passed on to the Decision Maker 910, completing the full optimization loop.

1.4.1 Job Scheduling

Recall that the term campaign refers to a set of media purchases over a period by a particular splash page sponsor, usually linked to a specific business objective, over which the creative splash pages need to be optimized. It is not necessary for a campaign to have a time limit. For instance, the problem of optimizing the daily news as items at a news site is a continuous process every day, without a set termination time. An advertising campaign is a set of creative advertisements along with a set of sites and sections within those sites for which a number of impressions have been purchased to be served over a period of time. An email campaign is a list of email addresses and a time frame during which mail is to be sent to this set of addresses.

Figure 5:
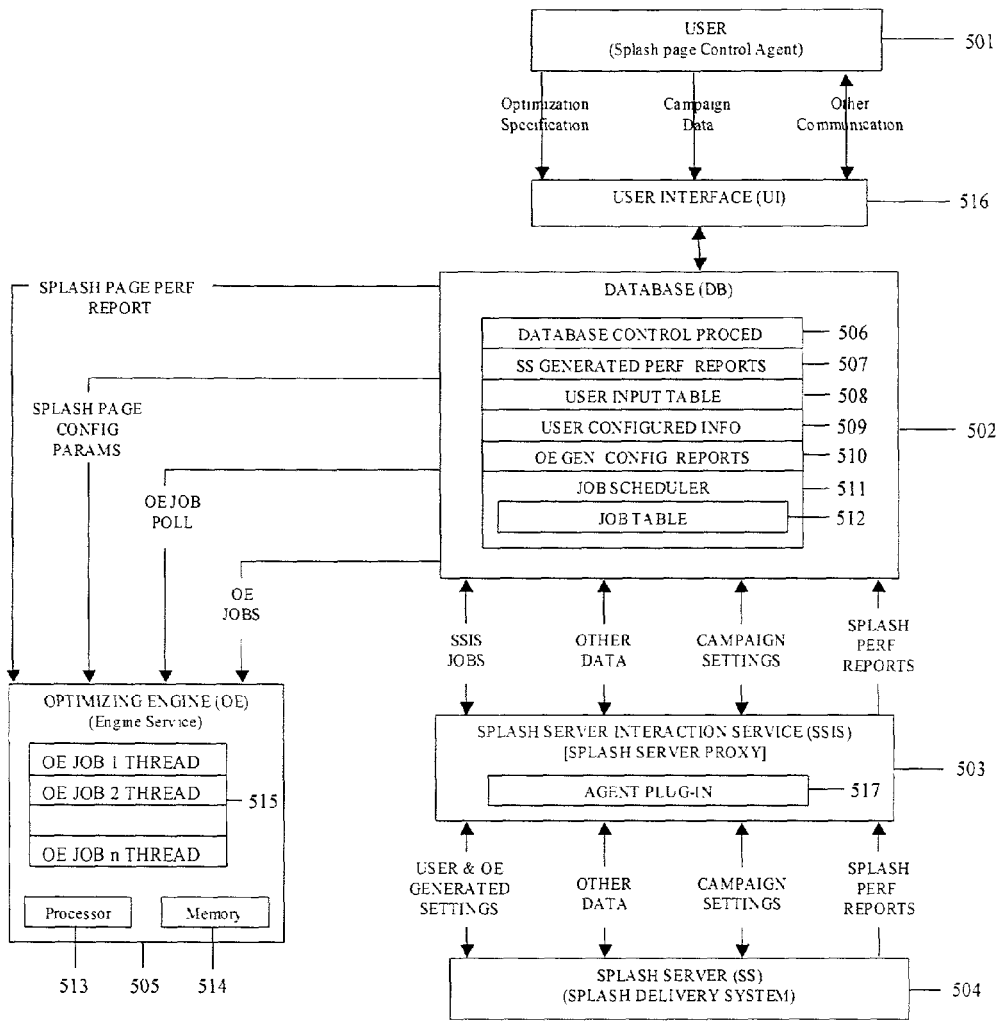
FIG. 5 is a diagrammatic illustration showing another embodiment of an overall system and operating model according to the invention, including the information and job control flow from the user interface through the database, optimization, and splash page delivery.

In FIG. 5, there is illustrated an exemplary embodiment of an overall system. In this embodiment, the User Interface 516 includes both an Authoring Module and a Control and Reporting Module as described in the User Interface section of this document and its subsections.

When the User Interface 516 system has gathered the above information, it schedules an Optimization Engine 505 targeted job in Job Scheduler 511, Job Table 512 of database 502 directing the engine service 505 to determine the initial set of allocations. This set of allocations is referred to as the "initial set of allocations" because when new splash pages are placed into the system it needs to be determined where these are placed, and what fractions of the impressions for a zone that are going to be assigned to that splash page. The Optimization Engine service executing within Optimization Engine 505, on completion of the OE job writes an initial set of allocations for different placements into the database and schedules a Splash Page Server Interaction Service 503 (e.g. an Splash Page Server Interaction Service) targeted job (SPSIS Job) to modify the appropriate settings on the Decision Maker of the Splash Page System.

Periodically or according to other rules, procedures, or events, the Splash Page Server Interaction Service (SPSIS) 503 aggregates the impression and action data, which is continuously being transferred from the applications queries to the database. These performance reports contain data on performance metrics for the splash pages. In the context where the splash page is a splash page on an Internet web site, the performance metric may be, for example, the total number of clickthroughs for a given splash page at a given zone and the total number of impressions delivered for that splash page. Another example of this report could be a list of splash page impressions. For each splash page impression information about the action or set of actions taken by the users and corresponding payoffs if any due to each action or each of the actions may be available. Also, information about the visitor profile for each impression may be available. In many cases, this information may be summarized along one or more visitor profile attributes or splash pages. More, fewer, or different data structure columns, fields, or organization may be provided to accomplish the optimization. The Splash Page Server Interaction Service 503 stores this performance information into the Database 502 and schedules an Optimization Engine targeted job tasking the Optimization Engine service to generate a new set of splash page allocations.

A scheduling infrastructure is provided for scheduling tasks or jobs in the system, particularly for scheduling jobs to be performed by the Optimization Engine 505 and the Splash page Server Information Service 503.

Part of this scheduling infrastructure is provided by a Job Table data structure 511 defined in the database 502 that is used for scheduling the various jobs in the system. Jobs are scheduled for both the Optimization Engine and for the Messaging Server Interaction Service. In one embodiment, the data structure of the Job Table includes the following columns: Service Type, Category, Scheduled Time, Status, Start Time, and End Time. More, fewer, or different data structure columns or organization may be provided to accomplish the functionality provided by these scheduling information items.

"Service Type" specifies the target system module that is expected to execute this job, for example, the Optimization Engine Service (OE), or the Splash Page Server Interaction Service (SPSIS).

"Category" specifies the type of job which the service needs to execute. For example, in one embodiment, six job type categories are supported: (i) Optimization (OP), for the optimization engine; (ii) Performance Analysis (PA), for the Optimization Engine; (iii) Download Campaign (DC), for the Splash Page Server Interaction Service; (iv) Get Report (GR), for the Splash Page Server Interaction Service; (v) Set Allocation (SA), for the Splash Page Server Interaction Service, and (vi) Design splash pages using attributes or specify attributes for splash pages.

"Status" specifies the current status of the job within a service. In one embodiment, there are four possible values of this field: (i) New (N), indicating that the job has not yet been opened by the service; (ii) Work-In-Progress (W), indicating that the job is currently in progress; (iii) Success (S), indicating that the job was completed successfully; and (iv) Failure (F), indicating that the job was not completed successfully, for example, due to an exception or a system error.

The Job Table 512 also provides time information. Those workers having ordinary skill in the art will appreciate that data and time information may be provided in a variety of ways and formats. For example, absolute or relative time may be used, and that some time parameters may be computed from other time parameters. Therefore, the particular time parameters described relative to one embodiment are exemplary.

The Job Table "Scheduled Time" field indicates the time at which the job is scheduled to be performed. This scheduled time may be manually entered, but is desirably determined by the system based on scheduling factors, such as for example the loading of the job target, the frequency of the jobs for a particular campaign, the expected time of availability of input data such as the availability of performance report data prior to an optimization, and the like factors. In one embodiment, Scheduled Time includes date information and time of day information and is encoded in conventional format.

The Job Table "Start Time" field indicates the actual starting time of the job. It may differ from the scheduled time. For example, if the job target has not completed a previous job or jobs or the loading on the job target is too great, the start of the job may be delayed somewhat. The "End Time" field indicates the time when the job was completed (successfully or unsuccessfully). Both Start Time and End Time may be considered to be optional parameters, however, in embodiments in which a service charge is levied based at least in part on the job computation time, knowledge of the actual start and end times permits computation of the elapsed computation time and provides an objective bases for service fees.

While each of these scheduling information items are present in the data structure of a preferred embodiment of the Job Table 512, it should be understood that not all of these information items are required in an operational system. For example, knowledge of the actual Start Time and End Time may be useful for monitoring the performance of the inventive system; however, the gathering or availability of such information does not affect the splash page optimization provided by the inventive system and method. In analogous manner, though knowledge that a job failed is advantageous so that the job may be rescheduled or other compensatory or corrective action taken, indications that the job is new or in-progress, ultimately have no effect on splash page optimization. Finally, though scheduling at predetermined times is desirable, the inventive system and method may be established in an environment where the jobs are merely scheduled sequentially or on a first-in-first-out basis. In this later instance, appropriate consideration and control should be exercised such that a first job generating results needed as inputs to a second job is scheduled and completed before the second job.

TABLE I

Exemplary Job Table for Database
JOB TABLE

| Service Type | Category | Scheduled Time | Status | Start Time | End Time |
|---|---|---|---|---|---|
| OE | PA | 14 Apr. 2000 23:50:00 | S | 14 Apr. 2000 23:50:00 | 14 Apr. 2000 23:50:32 |
| OE | OP | 14 Apr. 2000 23:59:00 | S | 14 Apr. 2000 23:59:00 | 15 Apr. 2000 00:00:09 |
| SPSIS | SA | 15 Apr. 2000 01:15:00 | W | 15 Apr. 2000 01:15:03 | |
| OE | PA | 15 Apr. 2000 01:18:00 | W | 15 Apr. 2000 01:18:00 | |
| SPSIS | GR | 15 Apr. 2000 20:10:00 | S | 15 Apr. 2000 20:10:04 | 15 Apr. 2000 20:11:09 |
| OE | OP | 15 Apr. 2000 21:0:00 | N | | |

1.4.2 Splash Page Interaction Service

The Splash Page Server Interaction Service (SPSIS) 503 manages the interaction between the splash page server and the rest of the system. In one embodiment illustrated in FIG. 5, the splash page server 504 is an external internet based splash page server. In other embodiments, such as for example the embodiment in FIG. 8, the splash page server 802 is integrated with the inventive system including the database, SPSIS, and Optimization Engine. The SPSIS is responsible for retrieving performance reports from the Splash Page Server (or Splash Page Delivery Service, if the splash pages are served from a different host) setting splash page allocations in the Splash Page Server, and downloading campaign settings from the Splash Page Server for use by the Optimization Engine and the User Interface.

The Splash Page Delivery Service 504 (SPDS) advantageously utilizes a plug-in architecture, where the interface to the splash page server (for example, to the Internet content server) is a replaceable module, which exposes a common application program interface (such as for example, the COM API). A "plug-in" is a module that implements this interface for a particular provider (for example, a particular Splash Page or Content Server). In the case of an external Internet-based Splash page Server, the plug-in is called an Agent (but this distinction between plug-in and agent is primarily semantic). The Agent accesses the Splash page server through the HTTP protocol. (Where communication links other than the Internet are used, alternative supported protocols may be used.) The Agent within the SPSIS 503 simulates the interaction of an Internet Splash page Server customer, requesting pages of data via HTTP and parsing the needed information out of the returned HTML data. Other Agents would get the data in XML, or other proprietary formats, based on the protocol supported by the underlying splash page server. Examples include HTTP:, FTP:, HTTPS:, or other public or proprietary protocols. The information extracted from the returned data includes splash page properties and names, zone properties and names, buy properties and names, campaign properties and names, performance data (such as clicks and impressions).

The parsing procedure includes the steps of deconstructing the HTML into its constituent tag structure and locating the desired data element at a known or identifiable place within the tag structure. Standard parsing techniques of tokenizing the text stream and applying a simple grammar to parse out the HTML are used. Those workers having ordinary skill in the art in light of the description provided here will appreciate that any standard parsing technique could be used to accomplish the result.

The SPSIS 503 interfaces with the Optimization Engine 505 and the User Interface 516 via the database 502. The SPSIS 503 retrieves jobs targeted for the SPSIS 503 (recall Service_Type=SPSIS in the Job Table identifies SPSIS 503 targeted jobs) from the database and acts on the job, placing the results (performance report information) back in the database.

The SPSIS 503 performs three types of jobs: Get Report, Set Allocations, and Download Campaign. For a Get Report (GetReport) job, the SPSIS 503 queries the Splash page Server 504 for a detailed listing of impressions and clicks for each advertisement in the campaign. Recall that an impression is an instance of possible exposure of the splash page to the end-user, and clicks represent one possible performance indicia as to the successfulness of the impression. Other measures of success may alternatively be used—for example, whether the user was actually converted into a customer for the goods or services offered by the advertiser, what was the lifetime value of the customer to the advertiser or whether the brand of the advertiser was recalled more successfully after the exposure. The downloaded information is stored in a staging table in the databases, using for example, SQL server's BCP fast copy operations, and a stored procedure performs transformations on the data to put it in the correct databases tables from where it would be used by the other system components tables. The staging table allows the batch uploading of a set of data containing potentially invalid elements, and then the execution of a verification process against the existing data in the database. Another difference between the staging table and the report table is that the report table contains key constraints between it and other tables in the system where the staging table does not. This means that the staging table has the requirement that each row of data in it have a corresponding entry in some other table elsewhere in the database. The staging table cannot have this requirement, as we do not make the effort to insure that the related elements exist in the related tables before bulk-uploading the data. This optimization allows fast upload of data into the staging tables.

For a Set Allocations (SetAllocations) job, the SPSIS 503 reads the current allocation settings for a campaign from the database 502 and for each advertisement with a current allocation, the SPSIS 503 issues a request to the Splash page Server 504 to modify the advertisement's properties in conformance with the allocation. Recall that an allocation specifies how the impressions are to be allocated amongst the different placements in the system. Typically, a Set Allocations job includes a batch of allocations to be set for the entire campaign at the same time, rather than an allocation specific to one splash page placement. Setting Allocations for more than one splash page placement at the same time reduces the number of connections required with the external Splash Page Server 504. The inventive system and method may alternatively be implemented without batched allocation setting.

For a Download Campaign (DownloadCampaign) job, the SPSIS 503 queries the Splash page Server 504 for a data listing buys, sites, zones, and advertisements for a given customer. Recall that a zone is a unique site and category combination, and a "buy" is a combination of the zones on a site at which the ads have been purchased. The resulting data from the Splash page Server 504 is stored in a local database within the system and is visible to the splash page product customer through the User Interface 516.

1.4.3 Engine Service

The Engine Service of the Optimization Engine 505 polls the Job table 512 of the Database 502 at regular intervals (or according to some predetermined rules or schedule) for the list of pending jobs to process. The optimization engine 505 and the optimization algorithm implemented by that engine is a main or core piece of algorithmic and computer program code that implements the mathematical models to provide the optimization recommendations and decisions. The engine service wraps this Optimization Engine to add the interaction with the database and other parts of the system. For each job in the list of pending jobs, the engine service invokes the appropriate process in a new thread. More particularly, the engine service polls the database to identify any jobs that are targeted to the Optimization Engine (OE) and the Engine Service provided thereby. Those jobs in the Job Table 512 having Service_Type=OE are targeted to the Optimization Engine 505 and the engine service. (Those jobs in the Job Table having Service_Type=SPSIS 503 are targeted to the Splash Page Server Interaction Service 503.)

Note that in some embodiments of the invention, the Optimization Engine 505 does not poll the database 502 and alternative mechanisms are provided to inform the Optimization Engine (or the splash page interactive service interface) that a job is ready for processing or execution. Therefore, either or both polling and non-polling implementations may be provided.

The Optimization Engine 505 and the optimization algorithm implemented by that engine provide the core pieces of computer program code that implements the mathematical models to implement the optimization decisions. The engine service wraps this Optimization Engine 505 to add the interaction with the database 502 and other parts of the system. One might conveniently use the two terms (Optimization Engine and optimization service) interchangeably but sometimes it is convenient to identify them separately.

Upon invocation of the Engine Service, the Optimization Engine 505 process executes one or more threads to accomplish processing for a given splash page campaign; and can kick off the processing of multiple campaigns at the same time. Processing is campaign-based because each campaign is (normally) completely independent from the other. Note that typically, the optimization and performance reporting are iterative in nature and that the longer the campaign runs, the greater the learning and optimization that can be accomplished. Messaging trends and performance will frequently change over time; the iterative nature means that the splash page allocations will continuously adapt as splash page saturation or staleness occurs. Even after a short period of time, such staleness is identified in the performance reports, and results in changes as recommended by the Optimization Engine 505.

The thread-based nature of an embodiment of the Optimization Engine 505 process is now described. The Database 502 is the persistent store for the Campaign states as well as all information gathered on a regular basis in the form of performance reports. On arrival of a new report or reports, a job is scheduled for the optimization engine to process the new report or reports on a per Campaign basis. New reports can arrive for multiple Campaigns at the same time. The Optimization Engine 505 process polls the database 502 on a regular basis for jobs that are ready to be run. Once the Optimization Engine gets a list of jobs that are ready to be run, it spawns a new thread 515 for processing each job independently of the other jobs.

The Engine Optimization 505 then queries the database 502 for all new performance reports for that campaign since the last time the Campaign State was updated. Campaign state includes splash page state or data, performance results state or data, and allocation state or data. For each such report it: (a) Reads the report from the database 502 into Optimization Engine main memory 514 data structures; and (b) Processes the report and updates the campaign state data structures. Using the new state and/or all the performance reports available so far, and applying suitable allocation algorithms, it generates new allocations for the Campaign and stores the allocations into new data structures in memory.

From a top-level perspective and in somewhat simplified terms, processing involves reading the previous performance data and generating the new recommendations. The new recommendations are also stored in the database. Additionally, "state" information may be stored to reduce the computational requirements of the algorithm. In the context of embodiments of the invention, "state" refers to the encapsulation of relevant cumulative knowledge/information gathered since a given start time of the Campaign. Additionally, the system may store a global campaign state. Global campaign state refers to the encapsulation of those properties/aspects of the Campaign that are relevant at the Campaign, but are not directly provided by the Splash Page Server Interaction Service 503 (or the splash page server).

All, or at least relevant or selected components, of the historical splash page allocations that have been made and the performance results that have been collected to date for a particular splash page campaign are stored in the database. Based on the performance report information available in the database, the Optimization Engine 505 models the performance of different splash pages and splash page attribute alternatives. The Optimization Engine 505 uses this historical information to generate new splash page allocations that direct or bias splash page impressions away from poor performing splash pages or splash page formats and/or attribute alternatives and toward appear to be better performing splash pages or splash page formats. In the Internet splash page context, alternatives may include modifying the allocations for splash page content (e.g. background color, products, and picture as applicable), different targeting attributes (such as for example, different splash pages for time of day, different geographical locations, browser types, frequency that splash page has been shown, and any other information that may be available about the end-user, their employer, or their operating environment), and the like splash page configuration information.

After completing the optimization, the system begins a database transaction. The Engine Optimization 505 process stores the new Campaign states, if any, (including splash page state) from the data structures in memory 514 to the database 502. It also stores the new Campaign allocations (including splash page allocations) from the memory data structures to the database. Once these operations are successful, the process commits the database transaction.

This database commitment process prevents corruption of data in the database 502 (which is the only reliable data in the system) by the intelligent use of database transactions. A database transaction is a database feature that provides the application with the ability to make multiple changes to the database 502 in an atomic fashion, that is, with the guarantee that either all changes to the database happen or that no changes happen. This prevents the possibility that the data in the database is updated only partially. In this particular embodiment, no other process in the system updates the Campaign states or generates allocations. This ensures the consistency and reliability of the Campaign states and allocations in the system. Other embodiments of the invention may utilize different database update procedures that do not provide the database commitment process assuring database integrity, however, such embodiments are not preferred.

In one embodiment, the Optimization Engine 505 processes two categories of jobs: (i) Performance Analysis jobs and (ii) Optimization jobs. Normally, at least one performance analysis report is generated by a performance analysis job before an optimization job for the same splash page campaign is executed; however, an initialization set of performance data may be loaded in the database at the start of a new campaign so that optimization may begin. The initialization set of performance data may be established manually, generated by other analysis, adopted from related campaigns, or obtained by any other means. In one embodiment, such initialization set of performance data is a neutral or unbiased data that sets candidate splash page attributes on an equal footing. In another embodiment, this data set is biased in favor of certain splash page attributes.

One embodiment of the invention will also generate these splash pages automatically using these various attribute-alternatives and deploy the splash pages (or other splash pages) that it learns to be most effective. Thus, the inventive system provides for automated autonomous splash page optimization, generation, and placement.

Embodiments of this optimization algorithm and procedure are also described below. It should however be understood that although embodiments of these particular algorithms and procedures may advantageously be used, the inventive system and method may alternatively utilize other processing routines, procedures, or algorithms in attempts to improve or optimize advertisement or splash page performance.

Clearly, the above embodiment of the optimization procedure is just one possible embodiment of the algorithm that can be used for optimizing the total number of responses. Algorithms based on other techniques such as genetic algorithms, neural networks, machine learning, stochastic optimization or a combination of these techniques can be used instead of the algorithm described. The overall system architecture is independent of the technique used.

1.4.4 Performance Analysis

A performance analysis job uses the data on the current sets of allocations and placements, the historical performance of each of these and the most recent performance report of the current allocations and placements in play as inputs and generates a new set of splash page allocations and placements (or in particular embodiments for an advertising splash page, which placements should be added or deleted and what allocation ratios to set for each advertisement) as outputs. The splash page allocations and placements generated by the Optimization Engine 505 are stored in the Database 502. (In some embodiments splash page allocations and placements may be cached for later use in a memory storage device of the Optimization Engine, or may directly affect the splash page server, without intermediate storage in the database.)

The performance reported to the Optimization Engine may consist of the complete set of visit-by-visit data, or a summarized (also known as "filtered") version of the data. The unfiltered data is fully described below (Section "Data Cleaning and Modeling"); briefly, it consists of a data record for each customer interaction, storing information about the action or actions taken by the visitor, the payoff or payoffs resulting from those actions, and various associated demographic, psychographic, and other visit data. In some cases, this data may be summarized or filtered in various ways, as described below. In particular, the data may be "discounted," so that more recent data is weighted differently than older data. In some cases, it may be advantageous to summarize a set of payoff data as a parameterized distribution; rather than deliver visit-by-visit data to the Optimization Engine, the performance analysis job would in this case deliver the distribution parameters. In some cases, other data aggregations may be useful; for example, such aggregations might advantageously reduce the amount of statistical noise in the system. Examples of such data aggregation algorithms are described below.

1.4.5 Reporting/Alerts

The system and method of the present invention can also optionally provide reporting and alert functions to inform the splash page sponsor such as the advertiser of significant events that might require their attention. This is desirable so that there is some human review of anomalous situations. Examples of some of the events or situations for which a special report or alert might be issued include, for example: (i) no impressions were delivered even though purchased by the advertiser; (ii) a large change in the type or number of impressions delivered; (iii) a large change in click-through in a given zone; (iv) a large change in a specific splash page's performance; and (v) the click-through performance achieved is below a specified contract minimum. Other situations for which a report or alert may be generated may be specified for the system. Advantageously, the situations for which special reports or alerts are generated may readily be altered in real or near-real time, such as by interactive programming. The system and method also desirably provide the ability to monitor ones splash pages using the User Interface and to create custom reports.

1.4.6 Reliability

The inventive system and method are inherently fault tolerant and can deal with a variety of potential failures including unavailability of the Splash page or Splash page Server 504, and the unavailability of the most recent performance reports. In a situation where the splash page server 504 is unavailable, the system user (for example, the splash page-sponsor) may still access past performance report information and current splash page allocations from the database 502 using the User Interface 516 instead of depending on the reliability of the underlying execution platform (e.g. the splash page server). When the most recent or current reports are not available, the Optimization Engine 505 service can produce the best splash page allocations based on the information available in the historical data, and the time elapsed since the last report was obtained, even if not all the reports are available.

As an operational service that delivers mission-critical data the runtime routines have to be highly reliable. If the site on which the system is hosted is inaccessible to a visitor request, the advertiser has completely wasted the advertising money that resulted in the customer click. The system must be able to restore to a known state (including incremental changes since the last backup) in a very short time. It is critical that the system should be able to restore some level of service (even serving the same splash pages consistently to all customers of a given client regardless of effectiveness) even when our backend database and/or analysis system is down—the front-end splash page service should desirably be architected for full redundancy and high availability.

1.4.7 Alternative Implementations

It can therefore be seen from the above description that the inventive optimization algorithm and procedure as well as indeed overall inventive system and method provide particularly advantageous benefits in the splash page messaging context. The methodology applied to banner ads can readily be extended to other messaging situations, for example to email, interactive television, other messaging and communication, and the like.

In one embodiment, the core engine optimization procedure is implemented as computer program software procedures written in the Java language for maximum flexibility and exposes a COM Application Program Interface (API). However, those workers having ordinary skill in the art in light of the description provided here will appreciate that various other languages may alternatively or additionally be used, and no doubt other languages and syntax will evolve that may alternatively be used to implement aspects of the invention.

1.5 Optimization Algorithms

One possible statement or description of the general optimization problem is as follows. Suppose that from some splash page there are (n+1) possible outcomes. One can think of each possible outcome as a branch from a node; the node is the page. The zeroth outcome has zero payoff; that is, the visitor leaves without taking any actions that are counted by the metrics of choice. The other n outcomes result in a payoff to the advertiser; the ith outcome occurs with probability $p_i$. Each of these n payoffs is supposed to come from its own (unknown) underlying distribution (that is, branches might include "book purchase," "CD purchase," or "movie purchase"). Each available page has its own set of available payoff branches, each branch with its own distribution and probability. Note that different pages need not have the same number of branches. Payoff distributions will not, in general, be described by common, named probability distributions. Also, each page may have a cost associated with it. The total payoff of the page will be the gross metric generated by the page minus the cost associated with that page. The problem is to maximize the payoff to the advertiser by serving the optimal page to each viewer. Workers with ordinary skill in the art will recognize that objectives may be different from maximization depending on the advertisers requirements; for example, advertisers may have different objectives.

It is often the case that the costs to the advertiser are nearly the same on each branch that does not result in a visitor action; that is, that results in "no purchase." In such a case, one embodiment of the algorithm approximates the multi-branched problem with a two-branched problem, at the expense of making the payoff function more complicated. In this case, a page may result in several different outcomes, each with its own payoff distribution. The situation is represented by a two-branch system; one branch corresponds to "no purchase," and the other branch represents all actions that contribute to the optimization metric. The composite payoff distribution represents the frequency of each outcome, as well as the different payoff distribution for each outcome.

Whether the multi-branched or the two-branched method is used, the payoff metric may be quite complex. To address this complexity, the algorithms will use a non-parametric description of the payoff distributions that will be sufficiently flexible to represent any data. Often, this non-parametric representation will be a stepwise function that approximates a histogram of the payoff distribution. Nevertheless, the algorithms do not depend on the details of the non-parametric representation.

In some cases, system users may have prior insight and will be able to identify a specific named probability distribution of the payoff metric for cases in which the user generates a non-zero payoff, such as Gaussian or lognormal. In such cases, the algorithm will use the appropriate distribution as a basis for metric comparison. Since such models tend to have fewer free parameters, they require less data, and therefore lead to faster optimization.

The problem is further simplified when the metric is binary—for example, the metric might be the number of visitors who sign up for a membership. Each visitor counts as either a success or a failure. The algorithms below handle the general continuous or multivalued metric problem as well as the binary metric problem.

Figure 10:
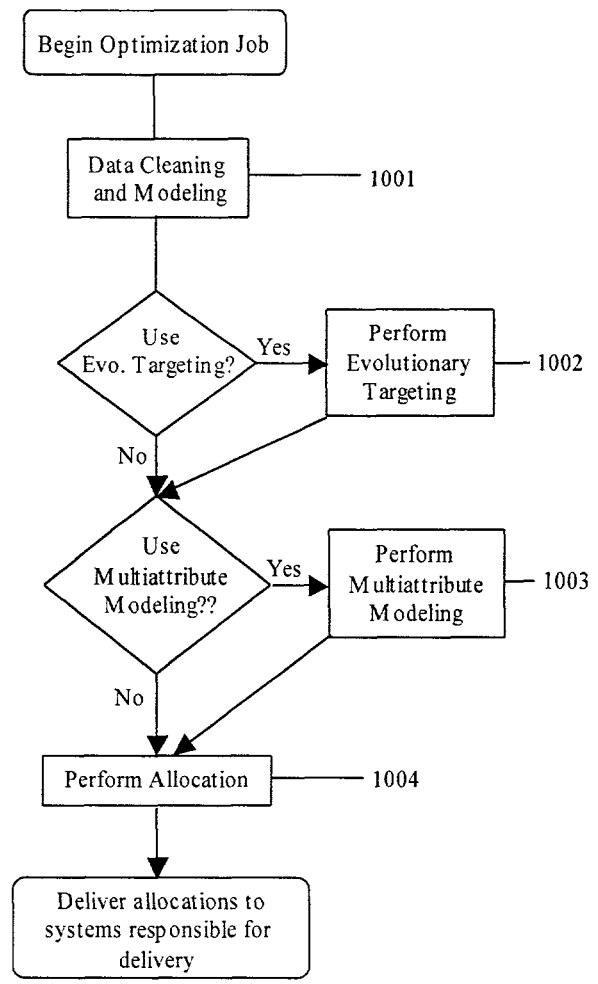
FIG. 10 is a flowchart showing the various steps performed by an embodiment of the optimization algorithms and procedures.

Each time an optimization job is scheduled, the following actions are typically completed as illustrated in FIG. 10 that illustrates a flowchart showing the various steps performed by the optimization algorithms according to one embodiment. Optimization occurs at each stage; that is, at each stage, the newly reported data is entered into a database along with the data from previous stages. Steps in the processes are listed below with a brief description.

1. Data Cleaning and Modeling 1001. This may involve cleaning the data for obvious errors, discounting the data to give more weight to recent data, modeling the underlying distribution of the payoff.
2. Targeting 1002. Divide the visitors into one or more subgroups. Generally, the splash page behavior for each subgroup is similar.
3. Multiattribute Modeling 1003. Determine the multiattribute model parameters for each subgroup in terms of the underlying attributes.
4. Allocation 1004. Generate allocations for each subgroup. The result of these algorithms is a set of allocations, specifying the fraction of visitors who arrive during the next stage who are to be directed to each splash page.

Having described certain high level features of the inventive optimization procedure as well as providing an exemplary environment in which the inventive procedure has particular applicability, attention is now directed to a description of a high level embodiment of the inventive algorithm or procedure.

1.5.1 Data Cleaning and Modeling

Before collected data is used for allocation, it may be processed or filtered in various ways, such as in order to improve statistical accuracy, leverage additional information, model the performance of different splash pages or otherwise improve the performance of the system. Among those filters are Data Cleaning, Discounting, Payoff Distribution Modeling. Those workers with ordinary skill in the art will recognize that there are many possible data processing methods, including various "filters," that may be applied along with these processing methods.

1.5.1.1 Data Cleaning

Advantageously, before the data is analyzed, one or more of a number of standard data cleaning techniques may be used to ensure the reliability of the data. These procedures are optional but highly desirable. These techniques may include consistency checks of various kinds; for example, checking that the number of clicks or actions is less than the number of impressions, or checking that all payoffs are positive. These examples illustrate "accounting" checks—data checks that consist of making sure that individual numbers are correct. Other data checks might include statistical checks, to ensure that various quantities are statistically distributed in the way that is expected. Once the integrity of the data has been verified, the analysis may begin. Note that this process can be automated; alternatively, it may include human subjective judgements.

1.5.1.2 Visitor Profiling

The objective is to maximize the payoff metric by altering the allocation of splash pages or splash pages presented to visitors. While the primary relevant information will be the outcomes for each visitor to the splash page, there will often be additional data available, such as demographic and psychographic, as well as information about the visitor's path, like the site on which the original banner was viewed, and the banner itself.

A variety of "profiling attributes" are available for each visitor. This information may include:

Data based on the current visit. Examples of this type of profiling information include the time of the visit, the type of browser used by the visitor, the IP address, the banner clicked by the visitor, the site where the banner was shown, the time of the day etc.

Data based on an earlier visit. An example is data from a registration form that was filled out by the visitor on an earlier visit. This may include demographic and psychographic information.

Data from external sources. For example, an external customer database may provide data on the purchase history of the visitor. This may include demographic and psychographic information.

The visitor profile space consists of a multidimensional space where each dimension corresponds to one of the above profiling attributes. Visitors may be classified into market segments based on this data. This profiling information consists of information provided by splash page servers or external data sources and provides an opportunity for customizing the splash page shown to each campaign visitor. A visitor segment consists of a portion of the visitor profile space; for example, segments based on age or income might be defined. By selecting different splash pages for different visitor segments, the overall campaign performance can be improved.

The inventive method will use a new algorithm to determine customer segments when the requisite data is available. The algorithm, known or referred to as evolutionary targeting, is described more fully below, and in co-pending U.S. Patent Application Ser. No. 60/255,949 filed Dec. 15, 2000, entitled Method, Algorithm, and Computer Program for Targeting Messages Including Advertisements in an Interactive Measurable Medium by Diane Chang, Sanjay Ranka, and Dan Veiner; which is incorporated herein by reference. It uses rigorous mathematical methods to identify subgroups of visitors with similar responses to the available advertisements.

1.5.1.3 Discounting

One embodiment of the inventive procedure optionally but advantageously uses a "discounting" of the performance data used for calculating the performance metric. Such discounting may be in the form of a binary step function where data older than a certain stage is simply ignored, in the form of a linear or non-linear weighting function, or according to any other weighting or discounting scheme. In one embodiment, the discounting is in the form of a geometrical discounting, that is, at the end of each stage all data (such as for example, the number of impressions and number of clickthroughs) is multiplied by a one-stage discount factor beta, $\beta$, where beta is a number less than one ($\beta<1$). Thus, data that is n stages old at the time when the procedure is executed will end up being multiplied by beta raised to the $n^{th}$ power ($\beta^n$). In this manner, newer performance data is weighted more highly than older performance data. While not true in all circumstances, it is generally true that newer performance data provides better guidance as to what allocation scheme will be successful in the next stage than will older performance data. In any particular situation where this generalization does not hold true, different discounting schemes, including for example a discounting scheme that weights some segment of performance data more heavily than newer performance data, may be applied. If no discounting is desired, beta may be set to one ($\beta=1$).

Discounting may be advantageously applied in certain cases, since the splash page performance may improve or deteriorate over time so that generally the performance of a splash page is non-stationary in a statistical sense. There are a number of potential reasons for a splash page to have non-stationary behavior in the underlying performance. For example, a splash page that promises overnight delivery may be quite effective shortly before Christmas when people are purchasing gifts for immediate delivery, but much less effective on the day after Christmas. Even absent a particular identifiable event, the performance of splash pages may change over time.

As an example of one kind of discounting that may be performed, we consider a binary metric. We consider successes (clicks, or some other binary measure) and impressions only. Those workers with ordinary skill in the art will recognize that similar methods may be used to discount payoff data as well. The terms "clicks" and "impressions" are understood to be representative of any sort of counting measure of successes, and any sort of counting measure of visitors. Let $s_1(t)$ denote the total number of discounted cumulative clicks and $n_1(t)$ denote the discounted cumulative number of impressions for splash page i at the end of stage t. Let $imp_i(t)$ denote the total number of impressions and $click_1(t)$ represent the total number of clicks and impressions for a particular splash page i in stage t. Then the discounted cumulative clicks $s_1(t)$ and the discounted cumulative impressions $n_1(t)$ are given by the following expressions:

$$s_1(t)=\beta s_1(t-1)+click_1(t-1), \text{ for } t \geq 2; \text{ and}$$

$$n_1(t)=\beta n_1(t-1)+imp_1(t-1), \text{ for } t \geq 2;$$

where $s_i(1)=0$ and $n_1(1)=0$. Discounting reduces the impact of old data and allows the inventive algorithm to be more responsive to new data that may reflect changes in the clickthroughs rates or other performance indicators.

The above expressions are specialized for an embodiment in which the performance metrics are based on numbers of "impressions" and "clickthroughs," where for a particular impression the viewer has the binary choice of either clicking-though or not clicking through for each impression.

In the set of equations above, the discounting is provided by the factor $\beta$. The above expressions can be easily generalized to an arbitrary or generalized discounting function G{ . . . } which uses the clickthrough impressions from the previous stages to derive the discounted cumulative clicks $s_i(t)$ and the discounted cumulative impressions $n_1(t)$ using the following expressions:

$$s_1(t)=G\{click_1(1),\ldots,click_1(t-2),click_1(t-1)\}, \text{ for } t\geq 2; \text{ and}$$

$$n_1(t)=G\{imp_1(1),\ldots,imp_1(t-2),imp_1(t-1)\}, \text{ for } t\geq 2;$$

where $s_i(1)=0$ and $n_1(1)=0$. In this generalized discounting function $G\{\ldots\}$, it is noted that none, some, or all, of the $click_1(t)$ and/or $imp_1(t)$ may actually weighted or discounted, though in the preferred embodiment each is discounted.

In particular, functions that give more weight to more recent values of $s_1$ and $n_1$ are of interest. When a different performance indicator than clickthroughs such as positive responses or "successes," or a continuous or multivalued payoff metric, are used, and a more general term applied to impressions such as "trials" is used, along with a generalized discounting function $H\{\ldots\}$, the general expressions for the total number of discounted successes $s_1(t)$ and the cumulative number of impressions $n_1(t)$ are given by the following expressions:

$$s_1(t)=H\{success_1(1),\ldots,success_1(t-2),success_1(t-1)\}, \text{ for } t\geq 2; \text{ and}$$

$$n_1(t)=H\{trial_i(1),\ldots,trial_1(t-1),trial_1(t-1)\}, \text{ for } t\geq 2,$$

where $s_1(1)=0$ and $n_1(1)=0$.

Note that the successes in this case need not be a simple count of the number of successful actions that occurred. In fact, it will often be advantageous to let success for any given visit be measured by a continuously valued description of the action. For example, success might be measured by the amount of balance transferred to an advertiser's credit card, the amount of money spent on a purchase, or an estimate of the total future value of the visitor.

As noted above for $G\{\ldots\}$, none, some, or all, of the $success_1(t)$ and/or $trial_1(t)$ may actually be weighted or discounted by the discounting function $H\{\ldots\}$, though in the preferred embodiment each is discounted.

In some cases, before the inventive system or method is used for optimization, a campaign may already be executing. In this case, information may be available regarding the performance of the splash pages. This performance information can be used to initialize $s_1(1)$ and $n_1(1)$ as follows. A cumulative or discounting procedure as described in the previous section can be use to estimate $s_1(1)$ and $n_1(1)$ in the same fashion as $s_1(t)$ and $n_1(t)$ are calculated, for example, by either using the cumulative sum or some form of discounting. Those workers having ordinary skill in the art in light of the description provided here will appreciate that there are several similar variations of the above basic strategy.

Even when the campaign is started fresh, a campaign manager may have used the same splash page in an earlier campaign or may have a prior judgment about the performance of the splash page. In this case, the value of $s_1(1)$ and $n_1(1)$ for splash page i can be set as follows. The manager can provide an estimate of the average performance of mean, for the splash page i over the previous campaigns. He/she may decide that the information from the previous campaign is worth $N_1$ impressions. In this case, $s_1(1)$ can be set to (mean$_1 \times N_1$) and $n_1(1)$ can be set to $N_1$.

The setting of $s_1(1)$ and $n_1(1)$ as described above can be used to incorporate managers prior experience or judgment of the splash pages. Larger values of $N_1$ imply that the manager is more confident about extrapolating the future performance of the splash page based on his prior experience or judgment.

Those workers having ordinary skill in the art in light of the description provided here will appreciate that there are several similar variations of the above basic strategy.

1.5.1.4 Payoff Distribution Modeling

In many cases, it will be advantageous for the system to optimize a continuous or multivalued measure of the quality of a visitor's action. Many examples of such measures have been given above; particularly illustrative is the example of the total visit purchase amount. Using this metric, splash pages that lead to more and larger sales will be preferred to those that lead to fewer and smaller sales. In some cases, splash pages that produce a few large sales will actually lead to greater revenues than other splash pages that lead to a larger number of very small sales. Similar situations may be easily conceived using a metric of gross profit. Those workers with ordinary skill in the art will recognize that many continuous or multivalued metrics might be reasonably adopted, depending on the specific nature of the product and the goals of the advertising organization.

In some cases, the system operator or the advertising organization will have prior information about the likely distribution of the continuous or multivalued metric over many visits. For example, a credit card company might reasonably expect that the distribution of balances transferred to a new credit card might be lognormally distributed. Historical data may be available to elucidate the choice of a particular statistical distribution to model the continuous or multivalued payoff metric. In such a case, the algorithms may summarize a large amount of payoff data via estimates of the parameters of appropriate named distributions.

Non-parametric distributions are very flexible, and do not impose prior constraints on the shape of payoff distributions. This flexibility comes at the price of a large number of free parameters. For example, one of the most general non-parametric distributions is the stepwise distribution, which has a form like the histogram of the payoff data. Such a distribution has one free parameter per step. Roughly speaking, the size of the standard error scales inversely with the amount of data available per free parameter. Therefore, more bins in the stepwise function require more data for an accurate estimate. However, fewer bins lead to a less accurate representation of the underlying distribution.

In some cases, we may have prior knowledge about the payoff distribution that would suggest a particular functional form of the distribution. When such information is available, it enables the standard error of the expected value to be reduced much more quickly—many well-known distributions have only one or two parameters.

The allocation algorithms described below can use the expected value and standard error in the expected value as calculated from a fit to an analytic distribution to optimize splash page allocation.

When prior information about the payoff metric distribution is not available, the system can choose the distribution—whether named or non-parametric—based on the data. For each candidate distribution, the maximum likelihood fit to the data is found. The resulting distributions are compared either with a likelihood ratio test, with Akaike's Information Criterion, or with a Bayesian comparison of the alternatives (See, for example, Kenneth P. Burnham and David R. Anderson, *Model Selection and Inference* (Springer, NY, 1998), incorporated herein by reference). The best alternative is chosen to describe the payoff distribution for that splash page. The algorithm may independently select a different distribution for each splash page. It may select from among a set of non-parametric distributions (e.g. stepwise distributions with different numbers of bins) or from a set of parametric distributions (e.g. normal, lognormal, beta) or from a combined set of parametric and non-parametric distributions. This evaluation is performed at regular intervals (for example, at every stage) so that the system is dynamically adaptive. The system can switch distributions at any time, as the data warrants. In this way, the algorithm always chooses the most accurate distribution that the current data can support.

1.5.2 Targeting

Two common situations encountered by the system are addressed via evolutionary targeting, as described in co-pending U.S. Patent Application Ser. No. 60/255,949 filed Dec. 15, 2000 entitled Method, Algorithm, and Computer Program for Targeting Messages Including Advertisements in an Interactive Measurable Medium by Diane Chang, Sanjay Ranka, and Dan Veiner, which is hereby incorporated by reference.

The first is the availability of additional demographic or psychographic data. With such data, the evolutionary targeting algorithm determines appropriate subgroups of visitors, and tailors the advertising to those subgroups. As more data is gathered, the evolutionary targeting algorithm can make more divisions as appropriate. In all cases, the subgroups are determined statistically from the data. The second common situation is that of low data rates. When very little data is available, it can be statistically impossible to distinguish between advertisements. In this case, the evolutionary targeting will group different advertisements and/or advertising placements together, assuming their performance to be similar until the data shows otherwise. The algorithm re-evaluates the groupings at regular intervals (for example, at every stage), and redefines the subgroups and supergroups as appropriate.

The evolutionary targeting algorithm begins with all candidates in a single group. It then tries different divisions of that initial group, and evaluates the likelihood of the new grouping. A likelihood ratio test determines whether the new grouping is preferable to the old. If the new grouping is preferred, the algorithm is called for each of the new groups to see if they should be further subdivided.

The evolutionary targeting algorithm may be used in two primary ways to optimize splash pages. First, it may be used in conjunction with demographic and/or psychographic information as described above. Second, it may be used in conjunction with information about the referring banner, site, or email link or any other information that distinguishes one visitor from another.

Most splash page visitors arrive at a splash page as a result of clicking on a banner ad. As a first approximation, the evolutionary targeting algorithm may assume that the performance of any splash page for a given visitor is independent of the banner advertisement that referred the visitor to the splash page. By combining the information about each splash page from all available banners, the optimization algorithms are able to more quickly identify non-contenders. As more visitor data becomes available, the evolutionary targeting algorithm will begin to analyze the splash page performance separately for banners that display significant differences.

1.5.3 Multiattribute Modeling

As described above, splash pages may often be described in terms of attributes. Performance of a splash page is taken to be a logistic function of the quality of the realized levels of each of the attributes. The multiattribute analysis considers each splash page as a set of attributes, as defined above in the "Definitions" section or elsewhere in this description. By collecting data on a number of splash pages, each displaying different levels of the various attributes, the multiattribute analysis can infer which levels of which attributes are responsible for the underlying performance.

Multi-attribute methods may be usefully employed for splash page optimization in two ways. First, reports may be generated on the optimal levels for each attribute. This information is useful to the advertiser in itself, and also can be used to aid design of future splash page creatives. Second, one embodiment of the splash page optimizer would generate new splash pages with the levels of each attribute indicated by the multiattribute analysis. These splash pages would then be added to the set of available pages, to be optimized by the above algorithms. Thus, the algorithm would not only choose the best splash page from among the choices presented, but also proactively create splash pages that can reasonable be expected to perform well. The multiattribute methodology uses prior expectations of the behavior of an underlying model to arrive at splash page evaluations more quickly. At least in part, because non-parametric payoff models explicitly disavow any such prior knowledge, the multiattribute methodology is generally appropriate only when using parametric payoff models.

1.5.4 Allocation Algorithms

The following algorithms determine allocations of advertisements, such as splash pages, to maximize a given objective function. These algorithms compare the performance of advertisements, either one pair at a time, or as an entire group. They determine the optimal splash page to serve to each visitor, subject to any constraints that have been imposed by the advertiser. These constraints may forbid the serving of certain splash pages to certain visitors based on the banner on which the visitor clicked, or other demographic, psychographic, or visit information that may be available. The optimization algorithms are capable of managing the addition or subtraction of splash page alternatives in the course of a campaign. If a splash page is removed, then the algorithms simply find the best remaining page. If a splash page is added in the middle of the campaign, it is allocated uniformly for one or more stages. It may then be compared with the older splash pages, as described below.

1.5.4.1 Pairwise Comparison Algorithm

The following algorithm may be advantageously used for either the atomic splash page optimization, or the multiattribute optimization. Furthermore, it may be used with a binary or continuous or multivalued payoff function.

Start with a uniform allocation. At the end of each stage, compute the expected value of the payoff distribution of each page, and the error in that expected value. Compare each splash page in turn with each of the others. For each comparison, calculate the difference in expected value divided by the standard error in that difference—call this statistic $\xi$. The error in the difference of the expected values is often taken to be the square root of the sum of the squared errors of the two expected values. If this calculated statistic is greater than some cutoff value $c_1$, declare that the losing splash page is a "non-contender." When all possible pairwise comparisons have been made, allocate the available visitors among the contenders. In particular, visitors may be allocated uniformly among contending splash pages. In general, all proportional allocations among contenders are possible.

Another embodiment of the algorithm divides splash pages into a number of different classes. Rather than allocating all impressions to contenders and no impressions to non-contenders, different classes of splash pages are allocated different numbers of impressions. Those splash pages that exceed the performance of some number of other pages with values of the calculated statistic greater than some cutoff ($c_1$) will be assigned to the highest class; splash pages with values of the calculated statistic in the range $c_k < \xi < c_{k-1}$ will be assigned to the kth class; etc. For example, three classes might be used, with the best-performing class of might be allocated ¾ of the available impressions, the second class being allocated ¼ of the available impressions, and the third class being allocated no impressions. In another embodiment, each class may receive some fraction of the available impressions, so that all splash pages receive some impressions. Those workers with ordinary skill in the art will recognize that there are a number of ways to perform the allocation of impressions for each class.

Additional methods for dividing splash pages into classes are described in U.S. patent application Ser. No. 09/586,387, filed Jun. 2, 2000 and entitled Method, Algorithm, and Computer Program for Optimizing the Performance of Messages Including Advertisements in an Interactive Measurable Medium; which is hereby incorporated by reference.

It is known that binary-outcome metrics may be compared in this way (See, for example, John Whitehead, *The Design and Analysis of Sequential Clinical Trials* (John Wiley and Sons, Chichester, 1997), incorporated here by reference. U.S. patent application Ser. No. 09/586,387, filed Jun. 2, 2000 and entitled Method, Algorithm, and Computer Program for Optimizing the Performance of Messages Including Advertisements in an Interactive Measurable Medium, also describes binary-outcome comparisons. When the amount of data is sufficient to invoke the Central Limit Theorem, we have found that the method may be applied to continuous or multivalued metrics as well. In general, the expected value and the standard error in the expected value are found from a bootstrap calculation (See, for examples, Bradley Efron, Bootstrap methods: Another look at the jackknife. (*Annals of Statistics*, 7(1):1-26, January 1979), incorporated here by reference and Bryan F. J. Manly. *Randomization, Bootstrap and Monte Carlo Methods in Biology*, Chapman and Hall, London, 1991, incorporated herein by reference). If standard named distributions are available (see below) then the expectation value and standard error may be calculated from these distributions. We assume these errors to be normally distributed, so that the difference between two expected values is also normal, with variance equal to the sum of the error variances for the two expected values. If the normalized difference is greater than some cutoff, we deem the lesser page to be a non-contender. The cutoff value may be adjusted; lower values result in a more aggressive optimization, while higher values result in a more careful optimization.

Simulations of the algorithm show that it is able to properly distinguish between advertisements with different payoff distributions.

1.5.4.2 Monte Carlo Likely-Best

The following algorithm may be advantageously used for either the atomic splash page optimization, or the multiattribute optimization. Furthermore, it may be used with a binary or continuous or multivalued payoff function.

Start with a uniform allocation. At the end of the each stage, estimate the expected value of payoff and the standard error of the expected value for each splash page. Perform a Monte Carlo simulation, drawing a value from each distribution as the sample payoff. Allocate visitors to each splash page in proportion to the fraction of Monte Carlo realizations in which that page was the best.

One of the splash pages must be the best; that is, have the highest expected payoff. Since we have expected values and standard errors for all of the splash pages, we could construct the probability that any given page is better than all of the others. In general, this will be an n-dimensional integral, where n is the number of pages. Rather than computing this integral precisely, we can do a short Monte Carlo. For each Monte Carlo realization, we draw a "sample expected value" from the expected value estimates and their errors. The entire set of pages is sorted by their sample expected values, and the best page (for this realization) gets a point. After a suitable number of realizations, the points are normalized to result in an allocation for each page. Thus, if a page were best in 32% of the Monte Carlo realizations, it would receive 32% of the impressions in the next stage.

1.5.4.3 Pairwise Monte Carlo

The Pairwise Monte Carlo is a hybrid between the algorithms described above. It proceeds exactly like the Pairwise algorithm, but rather than assuming that the difference between the two expected values is normally distributed, it uses the two estimated means and the errors on those means to serve as the basis distribution for a Monte Carlo. Sample expected variances are drawn from the two distributions. If a page "loses" this head-to-head Monte Carlo competition more often than some designated cutoff $k_1$ (e.g. 80% of the Monte Carlo realizations) then it is declared a non-contender.

1.5.4.4 Multiattribute Analysis and the Allocation Algorithms

The algorithms described above may also be used when a multiattribute structure is in place. However, the comparison methods may be slightly modified. Because different splash pages may share some attribute levels in common, there are correlations in the performance of different pages. In the case of the analytic comparison, the covariance of the two pages in question must be subtracted in the calculation of the error in the difference between the two expected values. That is, the error in the difference of the estimates is taken to be the square root of the sum of the squared errors of the expected values minus the covariance of those expected values. In the case of the Monte Carlo simulations, the correlations must be represented as well. This may be advantageously performed by simulating the underlying attribute level values, and then determining the preferred pages via the multiattribute analysis. This will automatically include the appropriate covariance between pages.

1.5.5 Exemplary Optimization Procedure and Algorithm

Having described certain high level features of the inventive optimization procedure as well as providing an exemplary environment in which the inventive procedure has particular applicability, attention is now directed to details of a particular embodiment of the inventive algorithm or procedure. These particular applications and embodiments are described for purposes of illustration and not by way of limitation.

One embodiment of the methods, procedures, and algorithms described above is designed to optimize a set of splash pages on a web site. Each splash page may receive visitors who have clicked on a number of different banner ads at various sites on the Internet. Suppose that there are b banners, and s splash pages, and that initially, a visitor who clicks on any of the banners may be directed to any of the splash pages, resulting in b×s possible combinations. The objective function will be the total amount of money spent by a visitor. We will assume no prior information is available, and that a non-parametric distribution will be used, as appropriate, to describe the payoff frequency distribution. We assume that the cost to the advertiser of processing the customer is independent of the customer's actions. We will illustrate the Pairwise Comparison algorithm, with evolutionary targeting on the banners.

In this case, the system (such as for example a system as described in co-pending U.S. Patent Application Ser. No. 60/255,951 filed Dec. 15, 2000 entitled System, Method, and Business Operating Model for Improving the Performance of Splash Pages by Vikas Manocha, Sanjay Ranka, Sankrant Sanu, Michael Tuchen, Brian Jones, and Kevin Yen, and herein incorporated by reference) will collect the following data: for each visitor, the splash page shown to the visitor, the banner ad that the visitor clicked on, the site and section where the visitor saw the banner ad, whether or not the visitor made a purchase, and the amount that the visitor spent.

At each stage, the system will generate a data report for the optimization methods, which will then compute the new allocations and return them to the system. The system will use the new allocations to serve splash pages to visitors in the next stage.

1.5.5.1 Payoff Model Selection and Calculation of Expected Values

Upon delivery of the data, the method will first estimate the expected value of each splash page. This process will be repeated for each splash page independently. The success rate is assumed binomial; thus, the maximum likelihood estimator of the success rate is p=s/n, where s is the number of visitors who bought something, and n is the total number of visitors. The standard error in the success rate is $\sqrt{p(1-p)/n}$. The expected value of the splash page is computed for each payoff distribution model. Suppose that three models are to be considered: a normal distribution, a 5-bin stepwise model, and a 12-bin stepwise model. The payoffs measured for the splash page are fit with a normal distribution using the maximum likelihood method, yielding the normal parameters $\mu$ and $\sigma$. To fit the stepwise distributions, the range between the maximum and minimum payoffs is divided into either m=5 or 12 bins. Let $n_1$ be the number of payoffs in bin i satisfying $$(i-1)/m \leq \frac{(\varphi - \varphi_{min})}{(\varphi_{max} - \varphi_{min})} < i/m,$$

where $\phi$ is the payoff value. Then the stepwise payoff function value for bin i is $n_1/n$. The variance in the expected payoff, in one embodiment, is estimated using a first-order Taylor series approximation to account for the contributions of the binomial success and the payoff size to the error in the expected value: $\sigma^2 = \sigma_p^2 \mu + \sigma_\mu^2 p$.

Next, we select the distribution that best describes the data. There are several methods to make this selection; among them are the likelihood ratio test (See, for example, S. S. Wilks, The large-sample distribution of the likelihood ratio for testing composite hypotheses (Annals of Mathematical Statistics, 9:60, 1938), incorporated herein by reference) and Akaike's Information Criterion (AIC) (See, for example, Kenneth P. Burnham and David R. Anderson, *Model Selection and Inference* (Springer, NY, 1998), incorporated herein by reference). We will illustrate the AIC method; those workers with ordinary skill in the art will recognize that other comparison tests are possible as well. To evaluate the various models, we calculate AIC=$-2$ log L+2K, where L is the maximum likelihood of the model, and K is the number of degrees of freedom of the model. For the normal model, K=2; for the stepwise models, K=5 and K=12. The model with the minimum value of AIC is the preferred model.

Once a model has been selected to describe the payoff distribution for each splash page, we can estimate the expected value of the payoff. In the case of the normal distribution, the expected value is $\mu$, and the standard error in the expected value is $\sigma/\sqrt{n}$. In the case of non-parametric distributions, the expected value $\mu$ and the standard error in that value may be found using bootstrap resampling methods.

1.5.5.2 Evolutionary Targeting

For the purposes of evolutionary targeting, the above calculations of expected values may be repeated for various groupings of splash pages. For this example, we will consider the possibility that splash pages have similar expected values across several of the different referring banners. The evolutionary targeting algorithm is described in greater detail in co-pending U.S. Patent Application Ser. No. 60/255,949 filed Dec. 15, 2000 entitled Method, Algorithm, and Computer Program for Targeting Messages Including Advertisements in an Interactive Measurable Medium by Diane Chang, Sanjay Ranka, and Dan Veiner; herein incorporated by reference and with a brief description of procedure and steps provided explicitly herein.

Initially, all available data for each splash page is pooled across all referring banners. The likelihood value of this large group is computed. A likelihood ratio test is employed to determine the most likely division of this larger group into subgroups. In this case, subgroups are will be sets of banners for which each splash page behaves similarly. Banner groups may be as small as one banner, or as large as the entire set of banners.

The division proceeds according to a greedy algorithm. One by one, each banner's visitors are pulled out into a separate group, forming b different groups of one banner. The likelihood of each potential division is evaluated, and the best division is kept. The result is two groups, one containing a single banner and the other containing the rest. Next, each banner in the larger group is added to the smaller group in turn. Each of these b–1 divisions results in two groups, one containing two banners, and one containing the rest. This procedure continues until the new set has reached size b–1. Then the best split of any size is identified. That best split is compared to the unsplit distribution using a likelihood ratio test, at a confidence level $\alpha$, typically 0.05. If the likelihood of the divided group is high enough (as dictated by the likelihood ratio test) then the split is adopted.

The entire procedure is then applied recursively to each new group (or with iterative implementations of a recursive approach). Finally, the expected payoff (and its standard error) may be computed for each splash page, using data from visitors who were referred to the splash page by any of the banners in that particular group.

1.5.5.3 Allocation Determination

Any of the algorithms described above may be used to find allocations. Here, the Pairwise Comparison algorithm will be illustrated. Allocations are performed separately for each banner group.

Each splash page, in turn, is "challenged" by each of the other splash pages. The result of the challenge is that either the splash page is defeated by the challenger, or it is not. "Defeat" of the splash page occurs when the comparison statistic $\delta$ exceeds some cutoff value. The cutoff value may be made larger, resulting in more careful optimization, or lower, resulting in more aggressive optimization. Typical values are between 0.2 and 0.5. The comparison statistic $\delta$ is given by the expression:

$$\delta = \frac{(\hat{\varphi}_c - \hat{\varphi})}{\sqrt{\sigma^2 + \sigma_c^2}}$$

where $\hat{\phi}$ is the estimate of the splash page expected payoff, $\hat{\phi}_c$ is the estimate of the challenger splash page expected payoff, $\sigma$ is the standard error in the expected payoff of the splash page, and $\sigma_c$ is the standard error in the expected payoff of the challenger page. If a splash page completes all pairwise challenges without being defeated, it is deemed a "contender." A splash page defeated by any challenger is a "non-contender."

Allocation in this case is straightforward—visitors who click on one of the banners in the group are directed to any of the contending splash pages with equal probability. No visitors are directed to non-contenders.

This process is repeated for all banner groups.

Note that the contender status of each splash page for each group is recomputed at every stage. Thus, a splash page may be deemed a non-contender for several stages, then be reintroduced if the other contending splash pages decline in performance.

1.5.5.4 Implementation of the Algorithms and Procedures on a Computer System

As the inventive method is advantageously implemented as a computer program on a general-purpose computer, such as for example a computer operating in an Internet or other network server environment, attention is now directed to an exemplary computer system, which may be used in conjunction with the inventive method, procedure, computer program, and computer program product.

Figure 9:
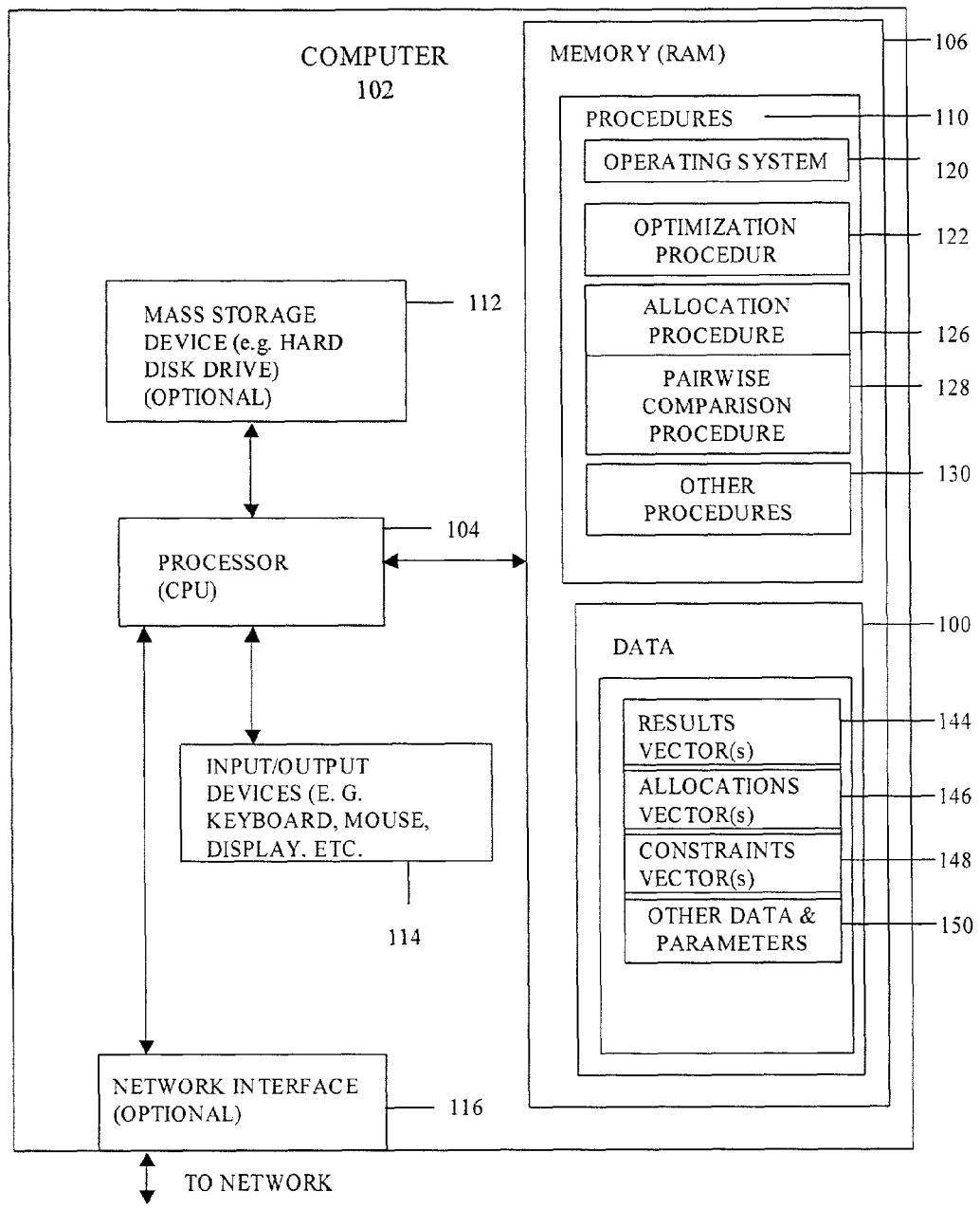
FIG. 9 is a diagrammatic illustration showing an exemplary embodiment of an Optimization Engine according to the invention, and its implementation on a computer having a processor and memory.

With respect to FIG. 9, computer 102 includes a processor or CPU 104 coupled to a fast random access memory 106 storing data 108 and procedures 110. Processor 104 is also conveniently coupled to one or more mass storage device 112 such as one or more hard disk drives of which many types are known, The mass storage devices may typically store information in one or more databases. In the context of the present invention, such databases may store performance data, allocation data, and other data and/or procedures or algorithms that are not currently being processed by the processor 104 or memory 106. Input/output devices 114 may also be conveniently coupled to the processor or other computer system 102 components for inputting data to the computer, retrieving results from the computer, monitoring activity on the computer or on other network devices coupled to the computer, or other operations as are known in the art. A network interface 116, such as a network interface card (NIC), modem, or the like is also conveniently provided.

Those workers having ordinary skill in the art in light of the description provided here will appreciate that the computer system 102 described here is merely exemplary and that various modifications may be made, or that other computer system architectures may be used in conjunction with the inventive system, method, and computer program.

1.6 Additional Embodiments 1.6.1 Different System Architecture

The above-described embodiment described relative to FIG. 3, provides for an external Splash page Server coupled to the database via the Internet through the Splash Page Server Interaction Service. This approach is advantageous because it allows a loose coupling between the optimization system and the Splash page Server where they may be operated by separate business and operational entities, for instance. This is also advantageous or possibly even require when for various business, security or operational reasons, the Optimization Service does not have direct access to the database that the Splash page Server uses. Another advantage of this embodiment is that it abstracts out the functions of each type of splash page servers so that the optimization system can work over different implementations of these servers possibly done by different business entities. It also allows the user experience with the overall interface presented by the optimization system to be independent of the Splash page Server, and can continue to operate even when the Splash page Serve configuration is unavailable. However, several other alternative configurations of the Splash page Server, Splash Page Server Interaction Service, and Database may be used.

Figure 6:
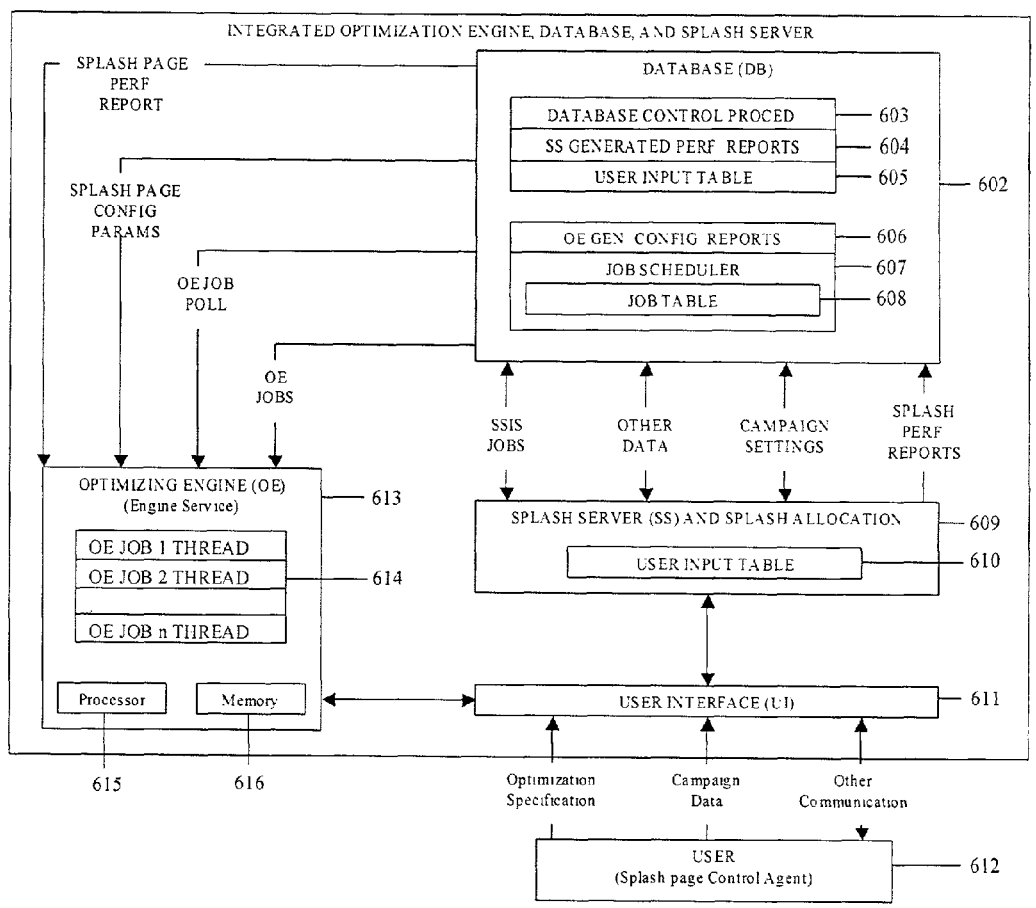
FIG. 6 is a diagrammatic illustration showing another detailed embodiment of the inventive system, including the information and job control flow from the user interface through the database, optimization, and splash page delivery.

In one of these alternative configurations 200 illustrated in FIG. 6, the Splash page Server 204 is part of an integrated system 202 including the Database 206, Optimization engine 208 and the User Interface 210. In this system 200 the Optimization Engine 208 is integrated right into the Splash page Server 204 and they share the same database. The User Interface 210 is integrated directly into the user interface of the Splash page Server—additional user interface elements are added on to the Splash page Server 204 user configuration interface to configure the optimization and get the optimization reports.

This second alternative configuration is advantageously used when the Splash page Server 204 and the rest of the optimization system can closely be integrated without business or operational issues. It has the benefit that the database parameters do not need to be copied into another database (other than optimization that may be done on the splash page server side for purpose of run-time performance). The detriment to integrating the Splash page Server 204 with the Optimization Engine 208 is that this may be infeasible because of business and operational necessities. Furthermore, this system will typically lose the flexibility of the being able to integrate with multiple splash page servers that may have different database schemas.

In this embodiment, the Splash page Server 204 directly enters the splash page performance reports into the database 206, and takes over all of the database activity that the SPSIS of the embodiment of FIG. 5 would perform. The part of the SPSIS that talks to the Splash page Server 204 is no longer needed since the Splash page Server can directly perform the functions internally. The need to get reports, download campaign settings, and communicated user and optimization engine settings now being performed within the integrated system or being eliminated. The functions of the optimization system would still exist in a similar fashion. The User Interface 210 component for interacting with an external user 218 would be altered to add just the additional parameters and reports that the optimization system needs or presents. Campaign Settings and Optimization Engine Generated Settings are established by the OE Engine Service 208 and communicated in a similar manner to the integrated database component 206. A user input table 216 may be provide within the Splash page server 204.

In this embodiment, the Job Table data structure is combined with the job structure that exists in the Splash page Server to generate periodic reports. In another embodiment, the Job Table remains unchanged, but all the jobs intended for SPSIS in other embodiments are performed directly by the Splash page Server 204 itself.

A simpler alternative embodiment of the inventive system 230 illustrated in FIG. 5, integrates the optimizing engine (OE) 232 and splash page server 236 performing splash page allocation and having an internal local data storage 238 or database, to an even greater extent. It also places responsibilities for other parts of a larger system to other entities while retaining a core that provides optimization and allocation. These elements may be combined on or within the same machine or on collocated machines and operate with direct communication. The optimizing engine 232 receives optimizing specifications 240 from an external source and generates splash page allocations which it uses to server splash pages. As in other embodiments described here, the splash pages may be advertisements, emails, and the like, as described herein.

1.6.2 Redirection System

The Splash page server as described in the "System Design" section above serves the splash pages based on the current allocations that it has loaded. In one of the embodiment, the splash pages may not be part of the system. In this case, the Splash Pages are being hosted by the client itself or by a third party content server. The Splash Page Server has the URLs to all the splash pages. When an HTTP request comes to the Splash Page Server, it redirects the request to one of the URLs based on the allocations. We will refer to this embodiment as a redirection system.

Although such redirection is not required, there are compelling business reasons for providing and using such a redirection system. Optimizing banners to maximize the performance of an online advertising campaign requires the advertiser and/or publisher to have the ability to turn on/off specific banners and to change targeting parameters continuously throughout the course of a campaign. The more easily and quickly these tasks can be done, the better the campaign results. Many advertisers rely directly on publishers and the publishers' ad serving systems to serve banners to viewers. Unfortunately, an advertiser in this situation often has very poor control over the banners. It can take up to three days for a publisher to turn on or off a banner, and using or changing targeting settings might be costly or not even possible. Further, even when has control, doing the analysis to determine what to change, and what change and to change things around is a tedious manual process.

Figure 7:
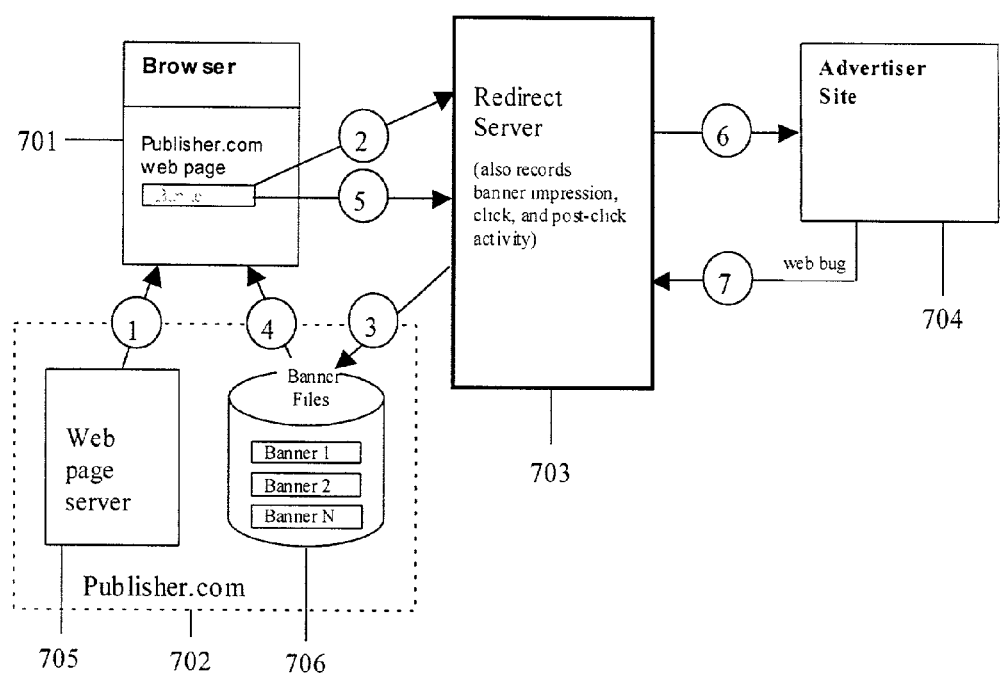
FIG. 7 is a diagrammatic illustration showing one embodiment of a system using a Redirect Server to control splash page serving.

Third party ad servers provide one potential solution. However, they generally do not optimize and serve the banner files. The cost of serving the banners is one of the most expensive portions of running an ad server. One embodiment of the Redirect Server of important commercial application is in this context of using publishers to serve banner ads. FIG. 7 illustrates each step of a Redirection method embodiment that may be implemented in the context of a Redirect system working in conjunction with a publisher ad system.

Publisher.com is used just as an example. The flow of the system is straightforward. Here is a description of each of the exemplary steps according to one embodiment.

1. Viewer loads a web page from publisher.com. publisher.com serves a redirect server URL where a banner is to appear. This is part of standard practice today as most publishers support third party ad servers.
2. The redirect server URL generates a request on Redirect server, which has a list of banners and their associated publisher.com URLs. This information is registered in Redirect Server as part of setup process.
3. Redirect Server records the impression and redirects the request to a specific publsher.com URL based on banner allocations determined by the advertiser or generated from the optimization engine.
4. publisher.com serves the selected banner to the viewer.
5. If the viewer decides to click on a banner, the click goes back to Redirect Sever.
6. Redirect Sever records the click and redirects it to the destination (advertiser) site.
7. If the user performs the desired post-click (back-end) action on the destination site, then a web bug served by Redirect Sever records the action. Click and action data are used for both reporting and optimization.

Effectively, the redirect server acts like an ad server without actually serving the banner. By not serving the banner, the redirect server can be offered as an inexpensive service for decision-making, reporting and auto optimizing the decisions. This will allow the advertiser greater control over his campaign at a much lower cost.

1.6.3 Different Receivers

Although the above described embodiments in sections "System Design," "Exemplary Implementation," "Different System Architectures," and "Redirection System" provide a splash page server that has been described as generally serving a splash page to a receiver, it is noted that the receiver may any one or more of a variety of receiver types. For example, the splash page will frequently be served to a personal computer connected to the world wide web via the internet. In other instances, the splash page will be served via interactive television, electronic mail, palm-top information appliances and/or Personal Data Assistants (PDAs), hand-held wireless devices, or other interactive media.

1.6.4 Different Message Types

In other embodiments, the following messages may be optimized using a system similar to the Splash Page System. Clearly each of these systems will serve different types of messages or a multiplicity of message types. These alternatives are offered by way of example not limitation.

1.6.4.1 Email

Email is an important medium for advertising, marketing, lobbying, and communicating and messaging generally. Many businesses now readily use email to acquire new customers, build brands, advertise and promote products, measure consumer satisfaction and manage customer relationships. A typical email campaign involves sending emails to each address on a list of recipients. The list may typically be bought or otherwise acquired from an outside firm or collected internally over a period of time. The procedures and algorithms developed above can be easily extended for optimizing the responses generated by emails. A embodiment of a system and method for improving the performance of Emails is described in U.S. patent application Ser. No. 09/586,394, filed Jun. 2, 2000 and entitled System and Method for Optimizing The Performance of Email and Other Splash Page Campaigns, which is hereby incorporated by reference.

The inventive procedures and algorithms may, for example, be extending to the email environment by decomposing the email process into multiple stages and dividing the measurement process into multiple stages. In each stage a fraction of total emails to be sent out to each alternative is given by the allocation algorithm described above. The major difference in an email application as compared to the afore described banner ad application is that there is a non-uniform delay between the time an email is sent out and the time a response is received. (For banner ads this delay is either non-existent for practical purposes or fairly uniform, for example the delay for a banner ad clickthrough may be between about 1 second and 60 seconds, well within one stage.) However, one can measure the total number of responses received for a given email alternatives by the end of a given stage and the total number of emails sent for that alternative as a way of measuring the performance of a given alternative. This information can then be used by the algorithm to determine and allocate the better alternatives and optimize the total number of responses over the entire campaign. The duration of the stage should advantageously be chosen to ensure that a reasonable fraction of overall responses are received by the end of each stage and the number of stages are large enough that the algorithm can learn the better performing alternatives in the earlier stages and exploit this information in later stages.

1.6.4.2 News

In yet another embodiment, the splash page that is being served is a generic information item, such as for example, a news headline, a news story, a photograph or other graphic, a stock quotation or set of stock quotations, sports news or feature stories, marketing promotions or coupons, text or images on a web-site, text or images on a personal digital assistant, using wireless or other media to connect, is a splash page shown on interactive television.

1.6.5 Integrated Multiple Message Server

In many situations, a visitor may touch multiple message types before reaching the action page on an advertiser site. An example of this is the following. The visitor receives an email alternative that consists of one of several banner ad alternatives. The visitor clicks on the banner to reach one of the splash page alternatives. In a new embodiment an integrated system serves all these messages and provides end-to-end optimization by finding the best combination of alternatives for each of the message types. The performance for each possible combination of alternatives is separately measured. Data cleaning and modeling techniques, including those described above in the section "Data Cleaning and Modeling" may be used to process data for each possible combination of alternatives. Then allocation algorithms may be used to select the particular combinations of alternatives that maximizes the objective function of interest to the advertiser.

Figure 8:
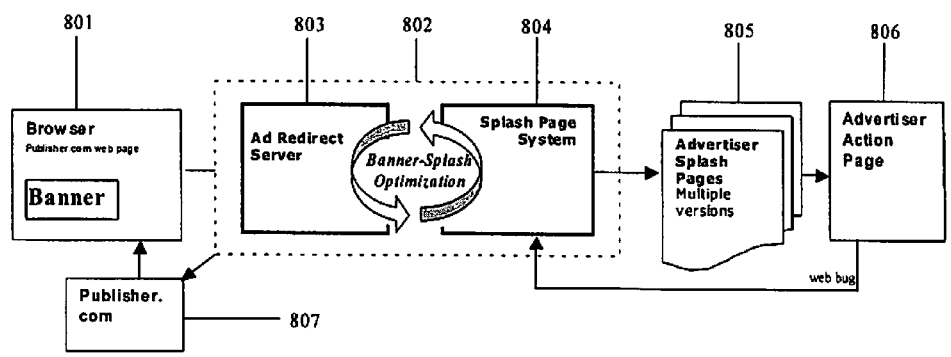
FIG. 8 is a diagrammatic illustration showing an embodiment of a system implements an end-to-end integration of the optimization of advertisements and splash pages.

An important example of such as embodiment is the banner ad and splash system shown in FIG. 8. An Ad Redirect server can be used in tandem with the splash page system for a complete, end-to-end optimization solution that automatically optimizes banners and banner-splash page combinations for a desired objective. In this integrated system, the system would generate the optimal banner allocations and provide them as allocation for the Ad Redirect Service. Only the banners corresponding to the best banner-splash page combinations will be served to viewers. Further, these banners will only redirect to the corresponding best splash pages.

1.6.6 Other Embodiments

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

We claim:

1. An article comprising a tangible machine readable medium that stores a program, the program being executed by a machine to perform a message allocation method comprising:
    defining a visitor profile space for each visitor to a web site, the visitor profile space comprising a multidimensional space, where each dimension of the multidimensional space corresponds to a visitor profiling attribute;
    classifying visitors into a plurality of visitor segments based on data in the visitor profile space, where each visitor segment comprises a portion of the visitor profile space; and
    for a given advertising campaign for the web site, associating different advertising messages for different visitor segments to increase a campaign performance metric;
    wherein an advertising message is a splash page for the web site.

2. The article as described in claim 1 wherein the visitor profiling attribute is data based on a current visit by a visitor to the web site.

3. The article as described in claim 2 wherein the data based on the current visit is one of: a time of the current visit, a type of browser used by the visitor, an IP address, a banner clicked by the visitor, a site identifier associated with the banner, and a time of day.

4. The article as described in claim 1 wherein the visitor profiling attribute is data based on an earlier visit to the web site by a visitor.

5. The article as described in claim 4 where the data based on an earlier visit is one of: demographic information, and psychographic information.

6. The article as described in claim 1 wherein the visitor profiling attribute is data from at least one external data source.

7. The article as described in claim 6 wherein the data is associated with a purchase history of a visitor at a web site.

8. The article as described in claim 1 wherein the method further includes applying a discount function to at least some data in the visitor profile space.

9. The article as described in claim 1 wherein the campaign performance metric is a payoff.

\* \* \* \* \*